United States Patent [19]
Kaifu

[11] Patent Number: 6,127,684
[45] Date of Patent: *Oct. 3, 2000

[54] PHOTOELECTRIC CONVERSION APPARATUS AND DRIVING METHOD OF THE APPARATUS

[75] Inventor: Noriyuki Kaifu, Hachioji, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/806,071

[22] Filed: Feb. 25, 1997

[30] Foreign Application Priority Data

Feb. 26, 1996 [JP] Japan .................................. 8-038185
Feb. 17, 1997 [JP] Japan .................................. 9-032365

[51] Int. Cl.[7] ...................................................... H04N 5/30
[52] U.S. Cl. .................................. 250/370.09; 250/208.1; 250/362
[58] Field of Search ........................ 250/370.09, 370.08, 250/370.11, 370.12, 362, 363.01, 371, 208.1, 208.2; 348/243

[56] References Cited

U.S. PATENT DOCUMENTS

| | | | |
|---|---|---|---|
| 4,533,954 | 8/1985 | Mitsuo et al. ........................... | 358/212 |
| 4,593,312 | 6/1986 | Yamasaki ................................. | 358/909 |
| 4,745,488 | 5/1988 | Kaifu et al. ............................... | 358/294 |
| 4,914,518 | 4/1990 | Suga ..................................... | 358/213.15 |
| 4,926,058 | 5/1990 | Iwamoto et al. ........................ | 250/578.1 |
| 4,985,775 | 1/1991 | Murayama et al. .................... | 358/213.1 |
| 5,233,442 | 8/1993 | Kawai et al. ............................ | 358/482 |
| 5,272,548 | 12/1993 | Kawai et al. ............................ | 358/482 |
| 5,317,406 | 5/1994 | Kobayashi et al. .................... | 348/307 |
| 5,335,094 | 8/1994 | Kaifu et al. ............................. | 358/494 |
| 5,352,884 | 10/1994 | Petrick et al. ........................ | 250/208.1 |
| 5,513,252 | 4/1996 | Blaschka et al. .................... | 378/98.8 |

FOREIGN PATENT DOCUMENTS

| | | |
|---|---|---|
| 0487108 | 5/1992 | European Pat. Off. . |
| 0615376 | 9/1994 | European Pat. Off. . |
| 0660421 | 6/1995 | European Pat. Off. . |
| 0776149 | 5/1997 | European Pat. Off. . |
| 0792062 | 8/1997 | European Pat. Off. . |
| 3338708 | 5/1984 | Germany . |
| 4218020 | 7/1993 | Germany . |
| WO9314418 | 7/1993 | WIPO . |

OTHER PUBLICATIONS

Patent Abstracts of Japan, vol. 013, No. 251 (E–771), Jun. 12, 1989 & JP 01 050670 A (Canon Inc), Feb. 27, 1989 *abstract*.

Primary Examiner—Seungsook Ham
Assistant Examiner—Richard Hanig
Attorney, Agent, or Firm—Fitzpatrick, Cella, Harper & Scinto

[57] ABSTRACT

In order to improve the reliability of apparatus and to attain signal outputs with high S/N ratios, a driving method of photoelectric conversion apparatus has a first mode for performing drive of photoelectric conversion elements, irrelevant to reading of information, and a second mode for dealing with reading of information, and transition to the second mode is carried out after a lapse of a desired time from the first mode.

75 Claims, 15 Drawing Sheets

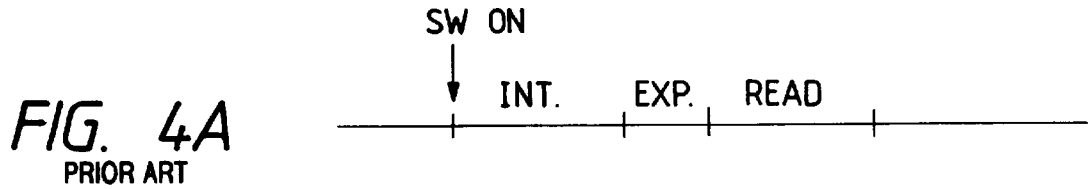
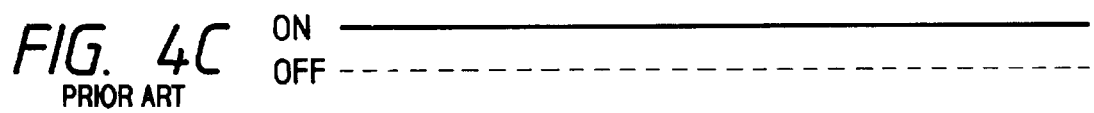
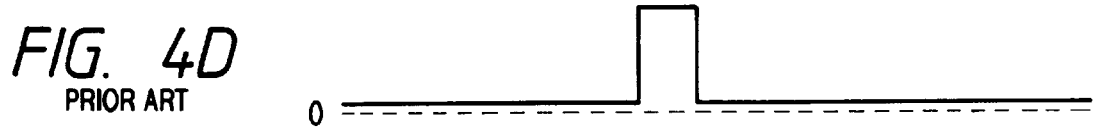
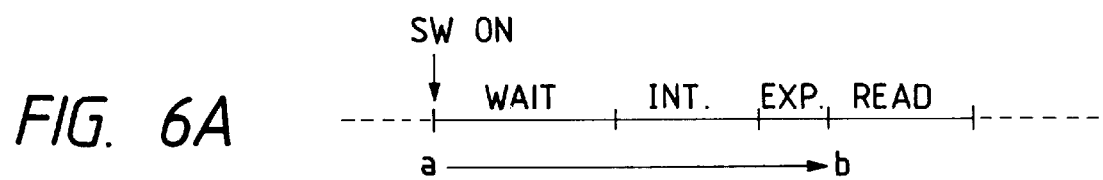
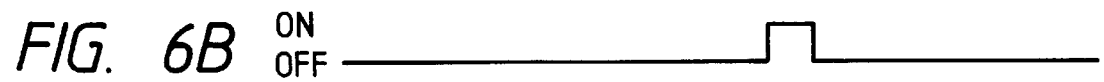

SW1 : OFF
SW2 : OFF

SW1 : ON ⇩
SW2 : OFF

SW1 : ON ⇩
SW2 : ON ⇩

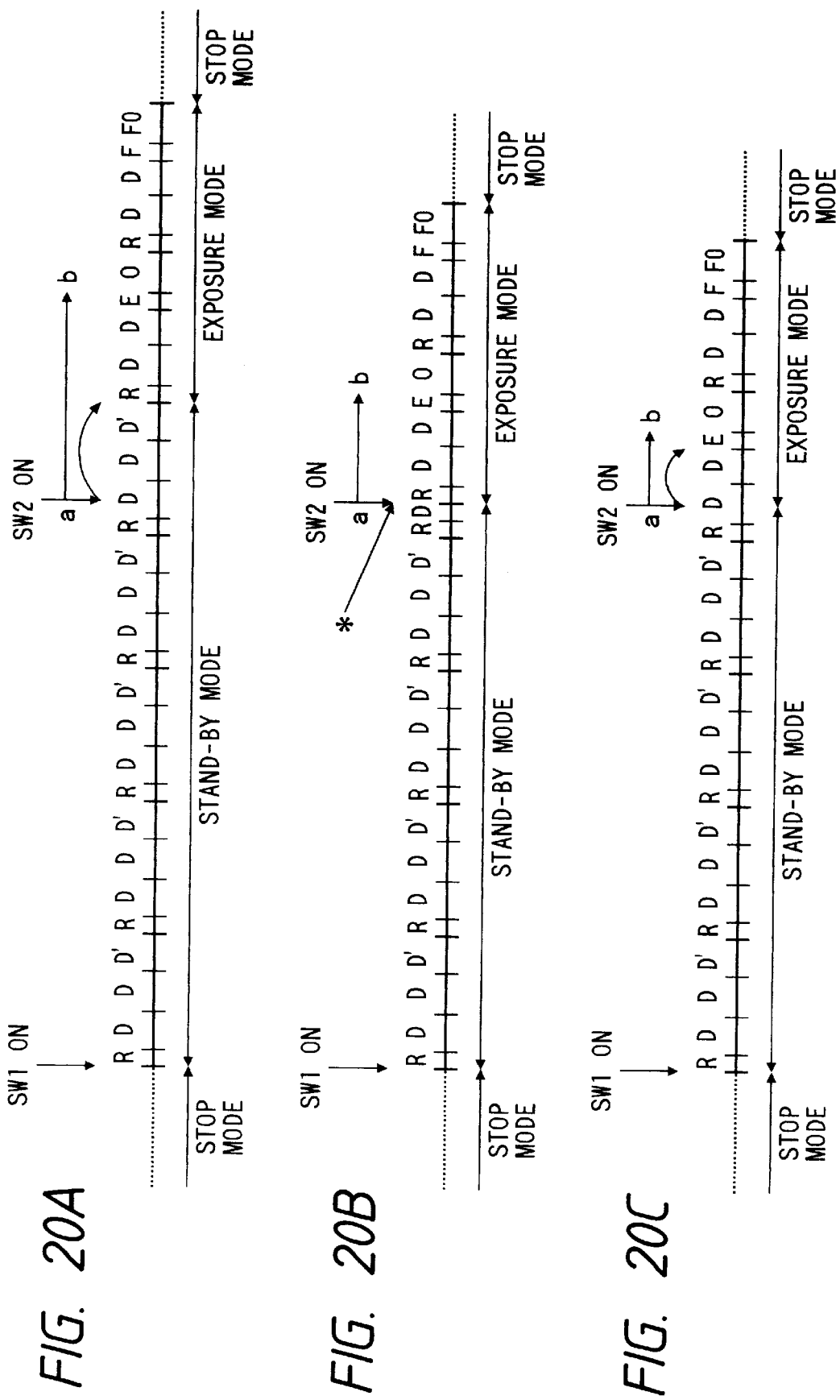

PHOTOELECTRIC CONVERSION APPARATUS AND DRIVING METHOD OF THE APPARATUS

BACKGROUND OF THE INVENTION

1. Field of the Invention

The present invention concerns a photoelectric conversion apparatus and a driving method thereof. More particularly, the invention relates to a photoelectric conversion apparatus and a driving method of the photoelectric conversion apparatus suitably used in imaging apparatus utilizing visible rays or radiations typified by X-rays, for example, in one-dimensional or two-dimensional imaging apparatus such as still cameras or radiation imaging apparatus.

2. Related Background Art

Most conventional photographs were silver-salt photographs taken using an optical camera and silver-salt film. Although the semiconductor technology is progressing to develop imaging apparatus that can pick up moving pictures, such as a video camcorder using a solid state image sensing device comprising Si single-crystal sensors typified by CCD sensors or MOS sensors, these images are inferior in the number of pixels and in S/N ratios to silver-salt photographs. It was thus normal practice to use the silver-salt photographs for taking still images.

On the other hand, a desire exists in recent years for electronic imaging apparatus that can output digital signals of images comparable to the silver-salt photographic images with increase in demands for image processing by computer, storage by electronic file system, and transmission of image by electronic mail system. This is also the case in the fields of examination and medical care as well as the ordinary photography.

For example, the X-ray photography is generally known as photography using the silver-salt photographic technology in the medical field. This is used in such a way that X-rays emitted from an X-ray source irradiate the affected part of a human body and that information of transmission thereof is used to judge presence or absence of fracture or tumor, for example, and has been widely used for medical diagnosis for a long time. Normally, X-rays transmitted by the affected part are made incident once into a fluorescent body to be converted thereby to visible light and the silver-salt film is exposed to the visible light. However, while silver-salt film has advantages such as high sensitivity and high resolution, it also has disadvantages, such as the long time necessary for development, the labor required for preservation and management, the inability of sending an image developed thereon quickly to a remote location, etc. Therefore, a desire exists for electronic X-ray imaging apparatus that can output digital signals of images comparable to the silver-salt photographic images, as discussed previously. Of course, this is the case not only in the medical field, but also in non-destructive examination of sample (detected object) such as a structural body.

Responding to this desire, imaging apparatus has been developed that uses a large-scale sensor in which image pickup elements using photoelectric conversion elements of hydrogenated amorphous silicon (hereinafter referred to as a-Si) are arrayed two-dimensionally. The imaging apparatus of this type is constructed, for example, in such a manner that a metal layer, an a-Si layer, and the like are deposited on an insulating substrate with each side ranging from 30 to 50 cm approximately, using a sputter system, a chemical vapor deposition system (CVD system), and the like, semiconductor diodes, for example, of approximately 2000× 2000 are formed, an electric field of a backward bias is applied to the diodes, and thin-film transistors (hereinafter referred to as TFT) also fabricated at the same time are used to detect respective charges of these individual diodes flowing in the backward direction. It is widely known that when the electric field in the backward direction is applied to a diode of semiconductor, photocurrent flows according to a quantity of light incident to the semiconductor layer, and this is utilized. However, an electric current so called dark current flows even in the state of no incident light, which causes shot noise. This shot noise is a factor to degrade detection performance of the total system, i.e., to lower the sensitivity, i.e., the S/N ratio. This could negatively affect judgment of medical diagnosis or examination. A misfocus or inaccurate evaluation of a defective part due to this noise can be a problem. It is thus important to reduce this dark current as much as possible.

It is also known that continuous application of the bias to the semiconductor diodes or other photoelectric conversion elements could cause the electric current flowing therein to increase imperfections in semiconductor, thereby gradually degrading their performance. This will appear as phenomena of increase of the dark current, reduction of the electric current due to light, i.e., reduction of photocurrent, and so on. In addition to the increase of imperfections, the continuous application of electric field could also cause a shift of threshold of TFT and corrosion of metal used for wiring because of movement of ions and electrolysis, thereby lowering reliability of the total system. Low reliability would raise a problem in bringing medical care equipment or examination equipment to the commercial stage. For example, failure must not occur during diagnosis, treatment, or examination in an emergency. The above description concerned the sensitivity and reliability with the example of semiconductor diodes, but the problems are common to the photoelectric conversion elements of various types without being limited to the diodes.

FIG. 1 is a schematic block diagram to show an example of the X-ray imaging apparatus. In FIG. 1, reference numeral 1 designates a sensor section in which many photoelectric conversion elements and TFTs are formed on an insulating substrate and in which an IC and the other circuits for controlling these are mounted. Roughly speaking, the sensor section has three terminal parts, a bias applying terminal (Bias) for applying an electric field to the photoelectric conversion elements, a start terminal (START) for supplying start signals of reading and initialization, and an output terminal (OUT) for outputting outputs from the respective photoelectric conversion elements arrayed two-dimensionally in the form of serial signals. Numeral 2 denotes an X-ray source, which emits pulsed X-rays under control of a control circuit 5. The X-rays pass through an examined part of a detected object such as the affected part of patient and the passing X-rays including information thereof travel toward the sensor section 1. A fluorescent body exists between the sensor section 1 and the detected object, though not illustrated, so that the passing X-rays are converted to visible light. The visible light after conversion is incident to the photoelectric conversion elements in the sensor section. Numeral 3 is a power supply for applying the electric field to the photoelectric conversion elements, which is controlled by a control switch (SW), or by the control circuit 5.

The above-stated apparatus, however, had improvable points as described below.

FIGS. 2A to 2D show an example of the operation of the X-ray imaging apparatus shown in FIG. 1. FIG. 2A to FIG.

2D are schematic timing charts each to show the operation in the imaging apparatus. FIG. 2A shows the operation of the imaging apparatus. FIG. 2B shows the X-ray emission timing of the X-ray source 2. FIG. 2C shows the timing of the bias applied to the photoelectric conversion elements. FIG. 2D shows the electric current flowing in the photoelectric conversion elements. FIG. 3 is a flowchart to show the flow of the operation.

In FIG. 2A before the arrow indicated by (SW ON) no bias is applied to the photoelectric conversion elements as shown in FIG. 2C (Bias OFF). Here, detection of <SW ON?> 301 is carried out as shown in FIG. 3. If the control switch (SW) is flipped on then [Bias ON] 302 will be effected. This is also shown in FIG. 2C. At the same time as it, charges of the individual photoelectric conversion elements in the sensor section 1 are initialized as shown by Int. of FIG. 2A and [Initialize Sensors] 303 of FIG. 3. After completion of the initialization, the control circuit 5 controls the X-ray source 2 to emit X-rays. This causes the imaging apparatus to perform exposure (Exp. of FIG. 2B and [Exposure] 304 of FIG. 3). After this, charges including optical information, having flowed in the individual photoelectric conversion elements, are read by the operation of internal TFTs and IC, as shown by Read of FIG. 2A and [Read Sensors] 305 of FIG. 3. After that, the electric field to the photoelectric conversion elements is turned to 0 (OFF) as shown in FIG. 2C or by [Bias OFF] of FIG. 3. Then the apparatus stands by until the control switch is next flipped on.

In the above operation, however, the electric current of the photoelectric conversion element is large before and after exposure as shown in FIG. 2D. Semiconductors, especially amorphous semiconductors such as a-Si, have a great dark current immediately after application of bias, so that the electric current flows despite no light incidence for a while. This is the influence of shot noise discussed previously and indicates a possibility of failure in reproduction of good X-ray image. This could result in failing to give appropriate diagnosis or examination. The reason of this dark current explained is such that the change of the electric field in semiconductor makes a place in which the Fermi level in the forbidden band moves relatively, which moves electrons and holes at the trap near the center of the forbidden band to cause the dark current. This trap results from imperfections of semiconductor and discontinuity of crystal structure at the interface between semiconductor and insulator, and thus the increase of dark current occurs in the photoelectric conversion elements of any material or any structure. Also, charges of ions or the like move immediately after application of the electric field, and an unstable electric current flows before stabilization thereof, which is another cause.

FIGS. 4A to 4D show another example of the operation of the X-ray imaging apparatus. The block diagram of the whole apparatus is the same as that of FIG. 1 and omitted herein. In FIGS. 4A to 4D like operations and representations are denoted by the same symbols as in FIGS. 2A to 2D. Most of the operations are the same as those in FIGS. 2A to 2D described above, but a different point is that the electric field is continuously applied to the photoelectric conversion elements as shown in FIG. 4C. Namely, as also seen in FIG. 5, the Bias ON state is maintained without providing [Bias ON/OFF] in the sequential operation for exposure. This decreases the dark current as shown in FIG. 4D, when compared to the operation shown in FIGS. 2A to 2D, and this seems to achieve a good image. This operation, however, includes a hidden problem in fact and cannot be employed as a product. The reason is that this operation requires the electric field to be always applied continuously to the photoelectric conversion elements during a period of time as long as the apparatus is possibly used, for example, for clinic examination hours of hospital. For example, supposing the imaging operation is carried out 100 times per day and for three seconds per person with the operation of FIGS. 2A to 2D, the time for application of electric field to the photoelectric conversion elements is 300 seconds in total. In contrast, supposing the possibly used period such as the clinic examination hours is 8 hours, the operation of FIGS. 4A to 4D continues about 30,000 seconds, which is the operation condition approximately 100 times longer. This results in also applying the electric field to the photoelectric conversion elements during the other periods than the actually photographing periods (i.e., during the nonoperative periods). This will also lower the reliability as discussed previously and does not suit practical use, also taking the maintenance fees and the like into consideration.

SUMMARY OF THE INVENTION

An object of the present invention is to provide a photoelectric conversion apparatus and a driving method of the photoelectric conversion apparatus, such as imaging apparatus, high in sensitivity, high in reliability, and good in operability, solving the above problem.

Another object of the present invention is to provide a photoelectric conversion apparatus and driving method thereof capable of attaining information with little noise and at a high S/N ratio.

A further object of the present invention is to provide a photoelectric conversion apparatus and driving method thereof being capable of obtaining image information at desired timing and not requiring irradiation more than necessary with radiations such as X-rays.

An additional object of the present invention is to provide a photoelectric conversion apparatus and driving method thereof that can obtain image information with high instantaneity without using the silver-salt film and that can obtain image information also permitting examination at a remote place.

A further object of the present invention is to provide a photoelectric conversion apparatus comprising:

a plurality of photoelectric conversion elements;

a drive circuit for driving the photoelectric conversion elements; and a control circuit for controlling said driving;

wherein said control circuit generates signals for starting a first mode for applying a voltage to said photoelectric conversion elements and a second mode for driving said photoelectric conversion elements.

A still further object of the present invention is to provide a driving method of a photoelectric conversion apparatus having a photoelectric conversion section in which a plurality of photoelectric conversion elements are arrayed two-dimensionally, comprising:

a first mode for applying a voltage to the photoelectric conversion elements; and a second mode for obtaining signal outputs carrying image information from the photoelectric conversion elements after a lapse of a desired time from the first mode.

BRIEF DESCRIPTION OF THE DRAWINGS

FIGS. 4A, 4B, 4C and 4D are schematic timing charts for explaining an example of drive and output of the photoelectric conversion apparatus;

FIGS. 6A, 6B, 6C and 6D are schematic timing charts for explaining an example of drive and output of the photoelectric conversion apparatus;

FIGS. 20A, 20B and 20C are schematic operation explanatory drawings for explaining an example of operation of the whole system.

DETAILED DESCRIPTION OF THE PREFERRED EMBODIMENTS

The photoelectric conversion apparatus and driving method thereof according to the present invention will be described.

The present invention comprises use of photoelectric conversion elements in a stabilized state, thereby realizing more accurate reading of information with reliability.

Also, the present invention prevents the photoelectric conversion elements from being always kept in a standby (wait) state, thereby lengthening the lifetime of element, improving the reliability of the apparatus body, and lowering the maintenance fees.

Figure 1:
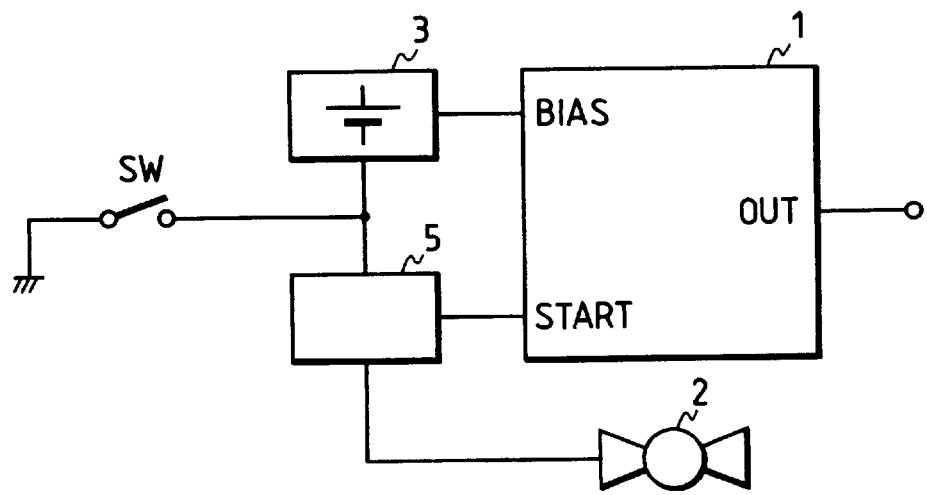
FIG. 1 is a schematic system block diagram having the photoelectric conversion apparatus.
Figure 2A:
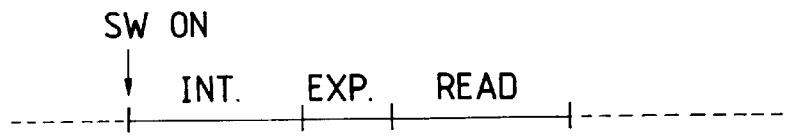
FIGS. 2A, 2B, 2C and 2D are schematic timing charts each for explaining an example of drive and output of the photoelectric conversion apparatus.
Figure 2B:
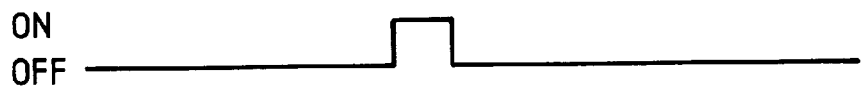
Figure 2C:
Figure 2D:
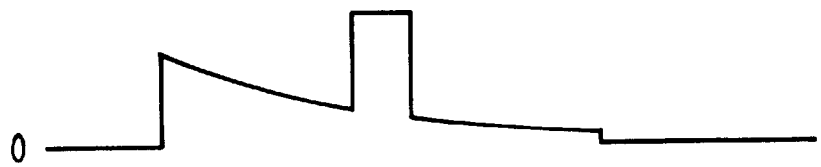
Figure 3:
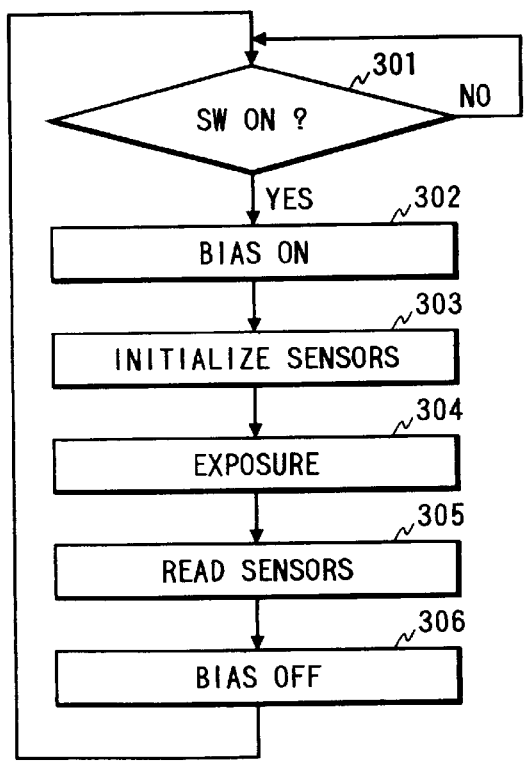
FIG. 3 is a flowchart for explaining the example of drive of the photoelectric conversion apparatus.
Figure 5:
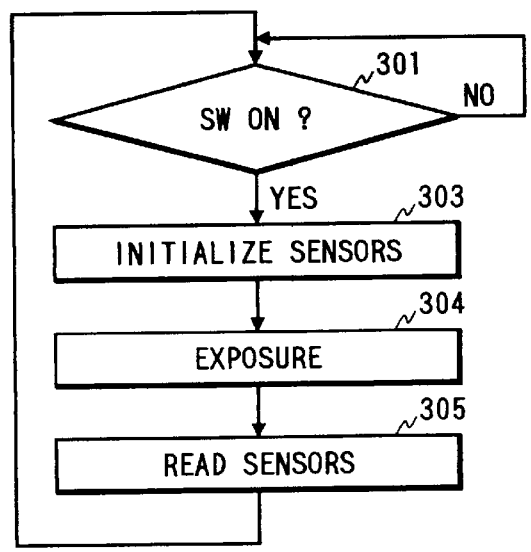
FIG. 5 is a flowchart for explaining the example of drive of the photoelectric conversion apparatus.
Figure 7:
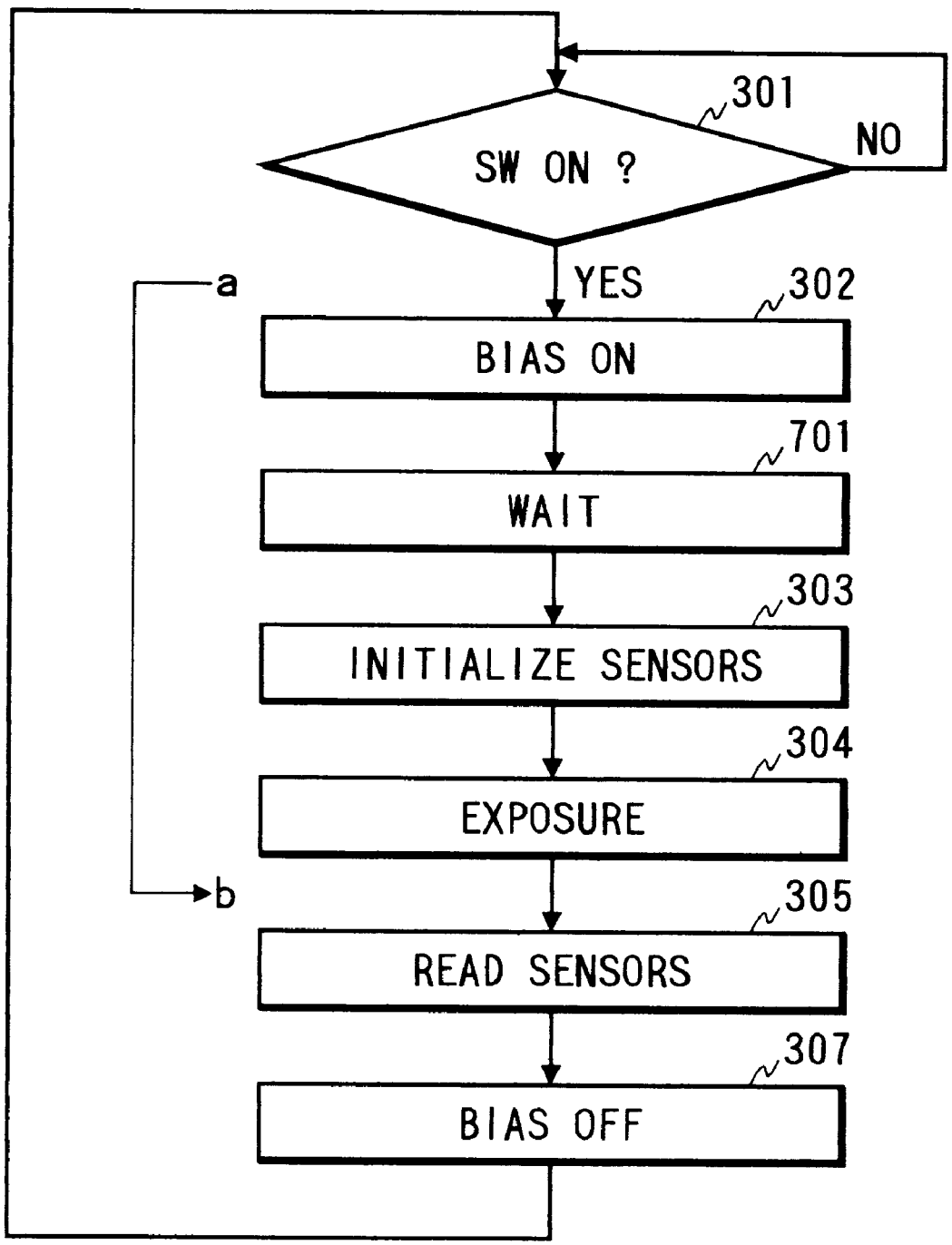
FIG. 7 is a flowchart for explaining the example of drive of the photoelectric conversion apparatus.

FIGS. 6A to 6D show an example of operation of an X-ray imaging apparatus according to the present invention. The block diagram of the entire apparatus is almost the same as that of FIG. 1 and is thus omitted. In FIGS. 6A to 6D like operations and representations are denoted by the same symbols as in FIGS. 2A to 2D. Most of the operations are the same as those in FIGS. 2A to 2D described previously, but a different point is that the operation of [Wait] 701 is added between [Bias ON] 302 and initialization of sensor section [Initialize Sensors] 303 as shown in FIG. 6A and FIG. 7. For example, a wait for 3 to 5 seconds is sufficient for this [Wait] 701, which can greatly improve the influence of dark current as shown in FIG. 6D, when compared with FIG. 2D.

This standby operation (wait 701) may be arranged to be activated for a desired time by a timer means after on of a photographing switch or may be arranged in such a manner that a photographer turns the switch on again.

The standby period is about 3 to 5 seconds as described above, which can solve the problem of start-up of element in practice. The standby period can be properly adjusted as occasion demands.

If the apparatus is arranged to automatically perform photography by the timer means or the like a predetermined time after the switch (shutter) is once turned on, the subject or the detected object is desirably one standing still. This is for assuring that a state according to a photographer's purpose is always photographed.

For example, in the case wherein photography is automatically executed after on of switch by the timer means, the detected body such as a patient must stand still during the period of 3 to 5 seconds after [SW ON] 301, i.e., after on of the control switch (so called as a shutter button). A doctor (or technical expert) usually makes the patient as a detected body take a pose effective to take a good photograph of the affected part or puts a detected body in position. Then, stopping breathing or motion of detected body if necessary, he or she turns the control switch on. In contrast with it, there are some cases wherein the patient cannot stand waiting for 3 to 5 seconds before exposure because it is too long for the patient to stand, especially, wherein the patient cannot stand even a short period when the patient stops breathing. In fact, an image will not be blurred even though the patient moves during [Wait] 701. However, since the patient does not know when exposure starts, the patient is not allowed as a result to move during the period between a and b, i.e., from on of the control switch to the end of exposure. Further, in the case wherein the doctor turns the control switch on at a shutter chance of photography through another sensor or the like, the detected body, stomach or bowels, or a machine, might move during the period of 3 to 5 seconds.

Now described is an imaging apparatus further (1) having higher sensitivity, (2) having higher reliability, and, in addition thereto, (3) having better operability, i.e., permitting photography at arbitrary timing. The imaging apparatus includes those for capturing image information in general and, particularly, is preferably an X-ray imaging apparatus. It is, however, noted that the present invention is not limited to the X-ray imaging apparatus.

Other embodiments of the present invention will be described with reference to the drawings.

Figure 8:
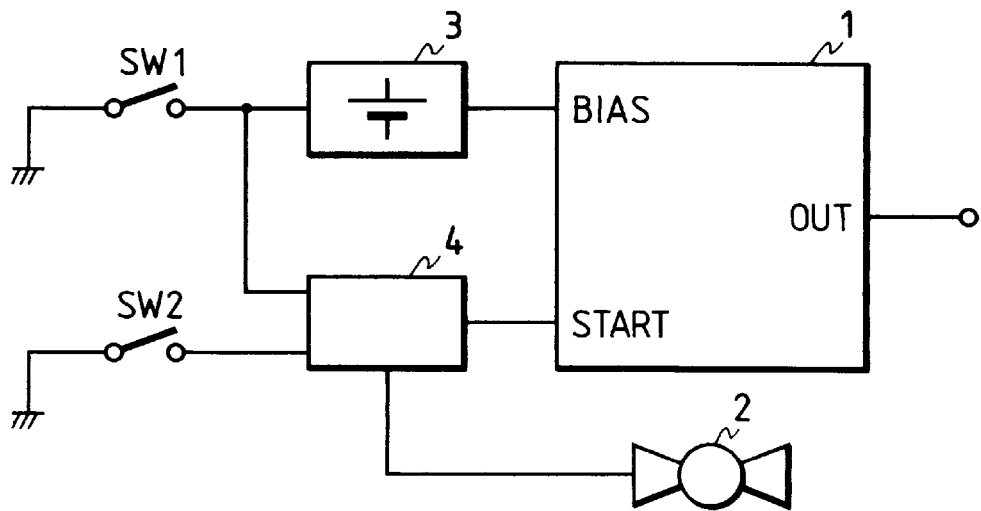
FIG. 8 is a schematic system block diagram for explaining a preferred example having the photoelectric conversion apparatus.

FIG. 8 is a schematic system block diagram of an image apparatus according to another embodiment of the present invention. In the present embodiment a radiation imaging apparatus is constructed for the purpose of X-ray examination (for example, X-ray diagnosis). In FIG. 8 like parts are denoted by the same symbols at corresponding positions as those in FIG. 1.

In FIG. 8, reference numeral 1 designates a sensor section, for example, in which many photoelectric conversion elements (photoelectric conversion means) and TFTs are formed on an insulating substrate and the IC etc. for controlling these are mounted. The sensor section 1 is illustrated as an example having three terminals, i.e., a bias applying terminal (Bias) for applying the electric field roughly to the photoelectric conversion elements, a start terminal (START) for supplying start signals of reading and initialization, and an output terminal (OUT) for outputting outputs from the respective photoelectric conversion elements arrayed two-dimensionally in the form of serial signals. Numeral 2 denotes an X-ray source, which emits pulsed X-rays under control of the control circuit 4. The X-rays pass through the affected part or examined part of a detected body such as a patient or an object and passing X-rays including information thereof travel toward the sensor section 1. Normally, there is a wavelength converter such as a fluorescent member, though not shown, between the sensor section 1 and the detected body and the passing X-rays are converted to wavelengths that can be detected by the sensor section 1, for example, to visible light. Then the visible light is incident to the photoelectric conversion elements in the sensor section 1. Numeral 3 is a power supply for applying the electric field to the photoelectric conversion elements, which is controlled by SW1 serving as a first switch means. Connected to the control circuit 4 are SW1 and SW2 serving as a second switch means, and start signals of various operations supplied to the sensor section 1 are controlled based on these two information and other information. At the same time, they give the X-ray source 2 the timing for emitting X-rays.

Figure 9A:
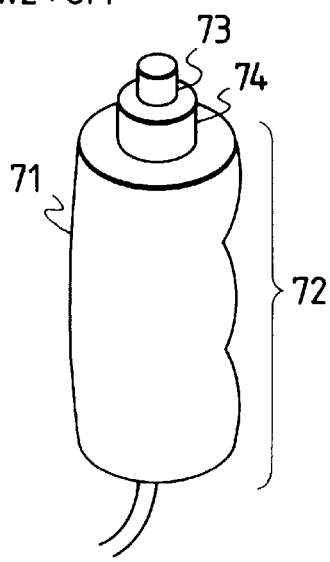
FIGS. 9A, 9B and 9C are schematic perspective views each for explaining a preferred example of switch.

FIG. 9A shows appearance of SW1 and SW2. SW1 and SW2 are mounted in such a griplike case as to permit the operator to handle it easily, thus constructing a switch box 71. The two switches and springs for the respective switches are enclosed in the case so that SW1 and SW2 are arranged to be kept both in an off state when they are free of the hand. Further, SW2 is equipped with a lock mechanism, which usually keeps SW2 in the off state and first becomes unlocked to allow motion of SW2 when SW1 is turned on, whereby it mechanically inhibits SW2 from being on as long as SW1 is off. The present embodiment is arranged to effect this inhibition mechanically, but it may be effected electrically. For example, when SW2 is depressed erroneously with SW1 off, it is electrically canceled to keep SW2 from being on. FIG. 9A shows a state free from the hand, wherein the switch lever 73 interlocked with SW1 and the switch lever 74 interlocked with SW2 are free, so that SW1 and SW2 are both off. When the operator handles this switch box 71, the operator grasps the grip portion 72 and puts the thumb in contact with SW1 switch lever 73. When the thumb lightly depresses the switch lever from this state, the switch lever goes into the state of FIG. 9B and then is stabilized once. This is because force of the spring of switch lever 73 is set weaker than pressing force necessary for depressing the elastic member such as the spring of switch lever 74. In this state SW1 is on while SW2 is off. When further depressed strongly, SW1 and SW2 both become on in the state of FIG. 9C. The switch box 71 is arranged to take the three states as described and is constructed so that SW1 and SW2 are not turned on while the operator does not touch this switch box 71, that is, while it is not manipulated. The force of the elastic member such as the spring of switch lever 73 is properly adjusted so that ordinary people cannot keep depressing it for a long time, for example, over one minute. This inhibits SW1 and SW2 from being kept carelessly depressed for a long time. Namely, a condition without state change over one minute can be regarded as a non-operative condition.

It is noted that SW1 and SW2 are not limited to the mechanical switch structure as described above. SW1 and SW2 may be provided independently and the above action may be effected on an electric circuit basis. Further, SW1 and SW2 may be constructed of electrical switches (transistors, for example) without having to be limited to the mechanical switches. In an example, a mechanical switch (SW0) is provided and SW1 and SW2 are constructed as electrical switches. In this case, for example, a circuit may be constructed in such a manner that when SW0 is depressed once, SW1 is turned on; after SW1 is freed and when SW0 is depressed again, SW2 is turned on; when SW0 is freed thereafter, SW1 and SW2 are turned off (two LEDs of different emission colors may be provided to display their radiation for discrimination between the first depression and second depression of SW0).

Figure 10A:
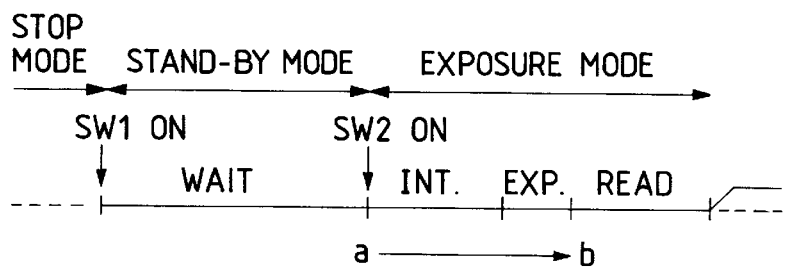
FIGS. 10A, 10B, 10C and 10D are schematic timing charts for explaining an example of drive and output of the photoelectric conversion apparatus.
Figure 10B:
Figure 10C:
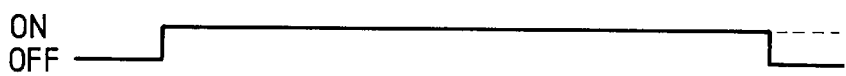
Figure 10D:
Figure 11:
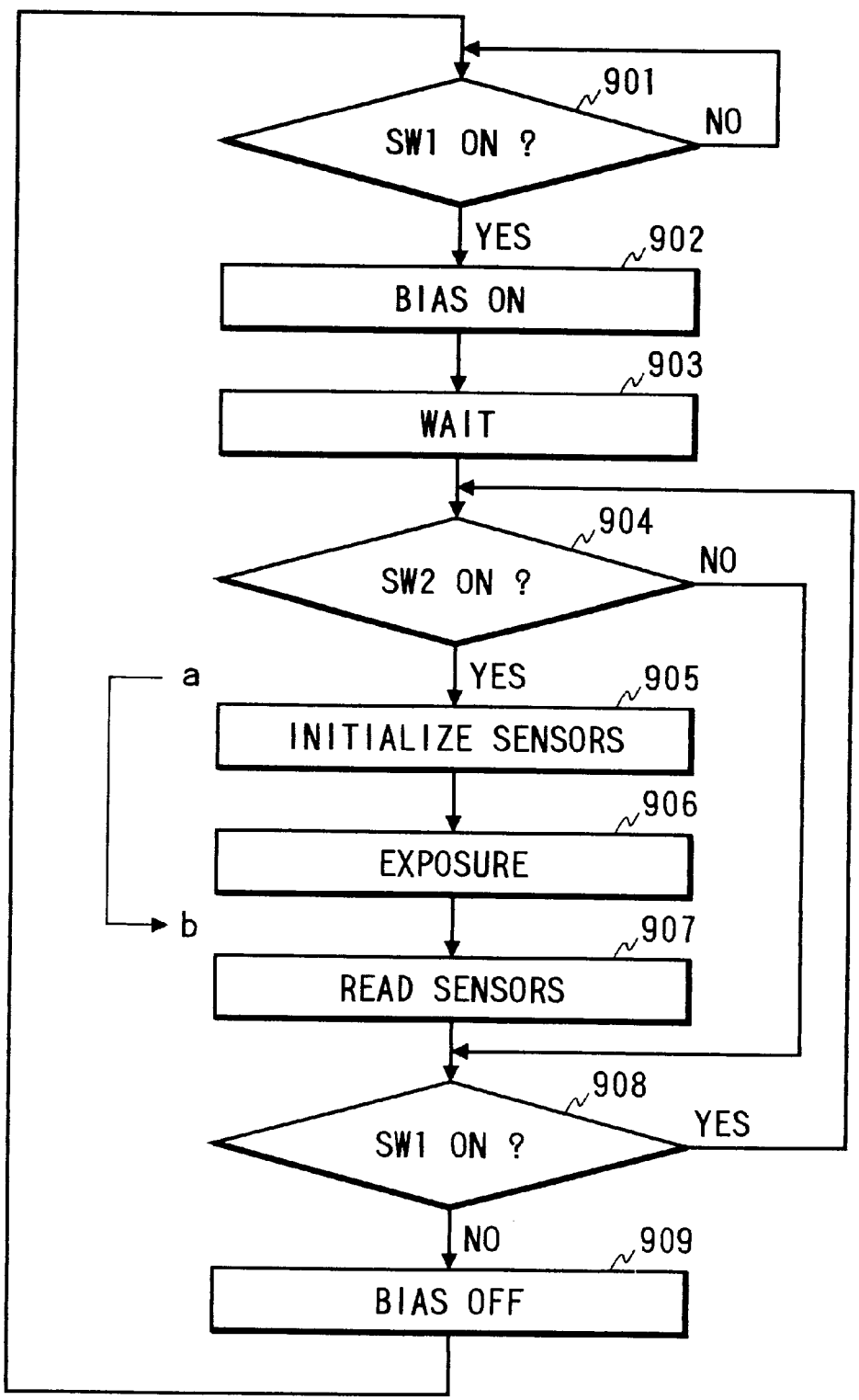
FIG. 11 is a flowchart for explaining the example of drive of the photoelectric conversion apparatus.

Now described referring to FIGS. 10A to 10D is an example of the operation of the imaging apparatus according to the present embodiment shown in FIG. 8. FIG. 10A to FIG. 10D are timing charts to show the operation in the imaging apparatus and FIG. 11 is a flowchart to show the flow of the operation. FIG. 10A shows the operation of the imaging apparatus. FIG. 10B is the X-ray emission timing of the X-ray source 2. FIG. 10C is the timing of the bias applied to the photoelectric conversion elements. FIG. 10D shows the electric current flowing in a certain representative photoelectric conversion element. In FIG. 10A the electric field or the bias is not applied to the photoelectric conversion elements as shown in FIG. 10C (Bias OFF), before the arrow indicated by (SW1 ON). This is because the control circuit 4 recognizes the non-operative condition to control the power supply 3 in a stop mode (Stop MODE). In the present embodiment the non-operative condition means off of SW1 and the control circuit 4 determines it by off of SW1. The dashed line indicates the state in which the bias is not applied. Here, determination of <SW1 ON?> 901 is carried out as shown in FIG. 11. If the control switch (SW1) is flipped on then [Bias ON] 902 is effected. This is also shown in FIG. 10C. In this condition the sensor section 1 is in the standby state as indicated by Wait or [Wait] 903 in FIG. 10A or FIG. 11. This state is defined as a standby mode (Stand-by MODE). During this standby state the dark current in the photoelectric conversion element is decreasing as shown in FIG. 10D. At this time the control circuit 4 inhibits the operator from turning SW2 on before a lapse of a constant time necessary for decrease of the dark current. The decrease of dark current may be determined by directly detecting the electric current, or the time necessary for the decrease may be preliminarily captured and then on of SW2 can be inhibited for the determined time. The method for this inhibition may be mechanical one or electrical one. Alternatively, the operator may be given a display of a lamp or the like for indicating the inhibition. Further, the control circuit may be arranged not to start the photographing operation even with depression of SW2. The operator can perform preparation for photography of the detected body such as the patient or the object during this inhibition. After this inhibition is released, the operator gives an instruction of "stop breathing" or the like if necessary, or starts a motion of object, and then turns SW2 on at timing for the operator to desire to obtain an image (SW2 ON) 904. When SW2 becomes on, the exposure mode (Exposure MODE) starts to initialize the charges of the individual photoelectric conversion elements in the sensor section 1 as indicated by Int. or [Initialize Sensors] 905 in FIG. 10A or FIG. 11. After completion of this initialization, the control circuit 4 controls the X-ray source 2 to emit X-rays. This effects exposure indicated by Exp. or [Exposure] 906 in FIG. 10B and FIG. 11. Completion of exposure ends photography of the detected body and at this point the detected body may move freely. This means that the detected body is required to stand still between a and b shown in FIG. 10A or FIG. 11. The initialization of the sensor section 1 usually ends in 30 to 300 ms and the pulse width of X-rays is 50 to 200 ms. Therefore, the detected body needs to stand still for about 0.5 second. After the exposure, the imaging apparatus reads the charges including optical information, having flowed in the individual photoelectric conversion elements, by the operation of the internal TFTs and IC as shown by Read or [Read Sensors] 907 in FIG. 10A or FIG. 11. After that, the status of SW1 is detected at <SW1 ON?> 908 in FIG. 11. If SW1 is off then the electric field of photoelectric conversion element will be turned to 0 as indicated by [Bias OFF] 909 shown in FIG. 10C or FIG. 11. Then the apparatus stands by until the control switch next becomes on. If SW1 is kept on in continuous photography, the photographing direction of the detected body will be changed or a next detected body such as a next patient will be soon made ready for photography. Then detection of SW2 on is awaited as shown in FIG. 11. This is efficient in continuous photography because there is no need for standby indicated by Wait and [Wait] 903 of FIG. 10A or FIG. 11 in the second time. If the operator wants to interrupt the operation for some reason after on of SW1 during these operations, the operator just leaves the switch lever of SW1 free to turn SW1 off, thus making [Bias OFF] 909 as shown in FIG. 11.

As described above, the present embodiment is arranged to apply no electric field to the photoelectric conversion elements during the non-operative condition, to decrease the dark current upon exposure, and to require the patient to stand still only for a moment, and thus, it provides the imaging apparatus with high reliability, with high sensitivity, and with excellent operability.

It is also needless to mention that the electric field of photoelectric conversion element need not to be 0 during the non-operative condition and the effect is achieved even with reduction of the electric field as compared with those in the various operations.

FIG. 12A to FIG. 12D and FIG. 13 are timing charts and flowchart to show the operation of still another embodiment of the present invention. The configuration of the system is the same as in the previous embodiment and is thus omitted. A different point from the previous embodiment is just the configuration of the control circuit. The present embodiment will be described referring to FIG. 12A to FIG. 12D and FIG. 13 with focus on the different part from FIG. 10A to FIG. 10D and FIG. 11.

Figure 12A:
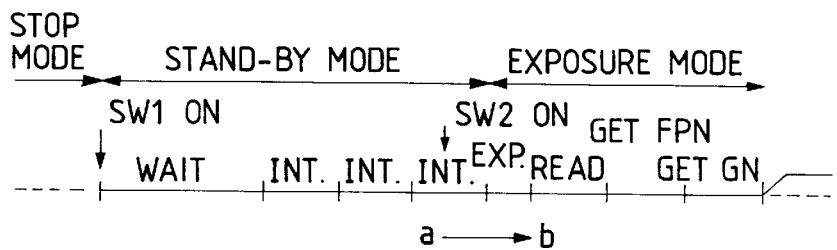
FIGS. 12A, 12B, 12C and 12D are schematic timing charts for explaining an example of drive and output of the photoelectric conversion apparatus.
Figure 12B:
Figure 12C:
Figure 12D:
Figure 13:
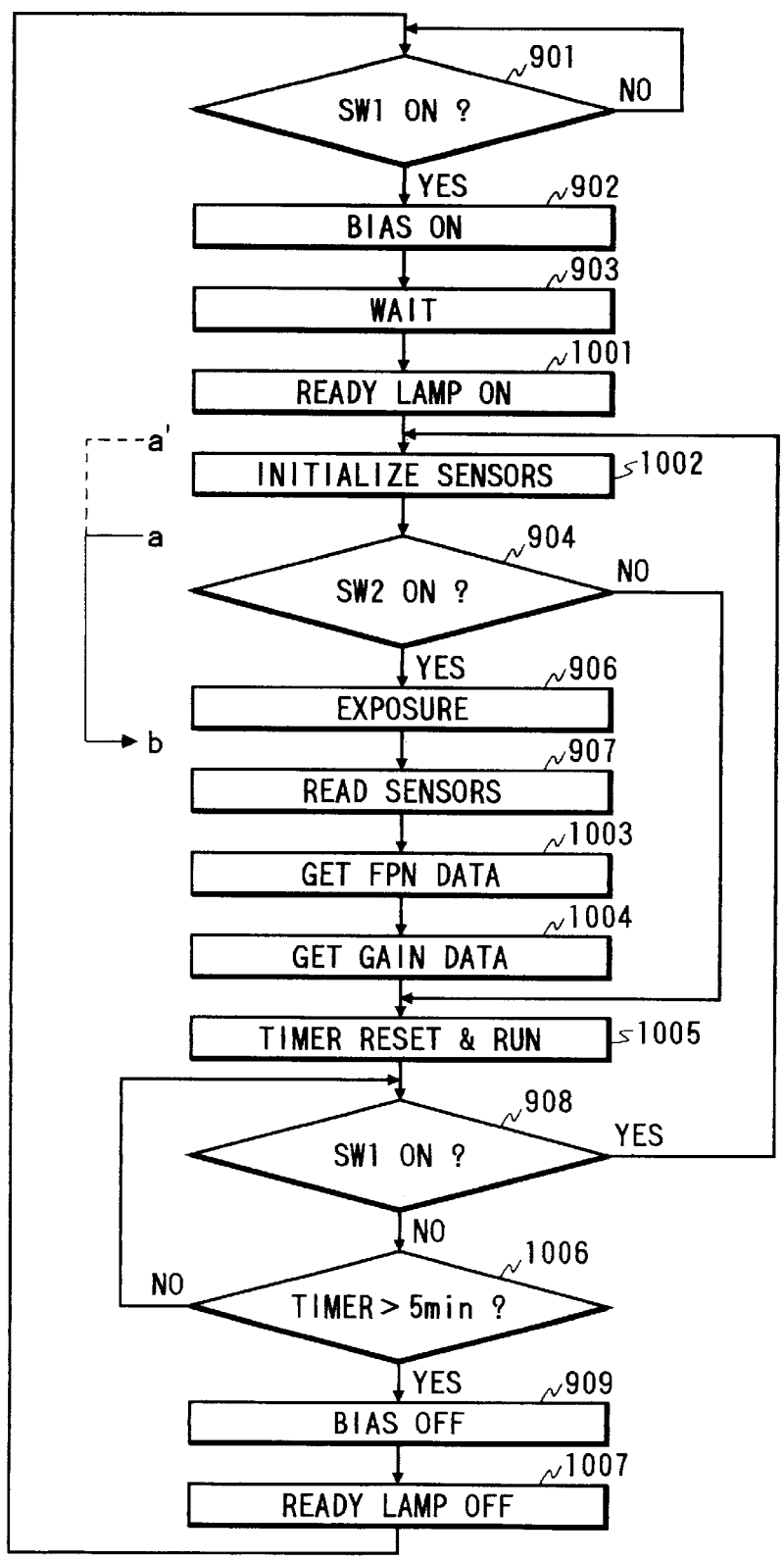
FIG. 13 is a flowchart for explaining the example of drive of the photoelectric conversion apparatus.

As seen in FIG. 12A or FIG. 13, the present embodiment is arranged to start initialization of the sensor section, Int. or [Initialize Sensors] 1002, soon after standby for a constant time in the standby mode. After end of the first initialization next initialization is started immediately and periodic initializations, i.e., continuous resets of internal charges are repeated. This prevents charges due to the dark current from accumulating in the sensor section because of the standby condition longer than necessary. The periodic charge resets are carried out actually almost in the same operative sequence, as the reading operation of charge after exposure, except for being, different more or less in the accumulation time in some cases there from. And the charge resets are different in that the signals obtained thereby is not used as information. The periodic charge reset operations in the sensor section (photoelectric conversion elements) are periodically repeated while the circuit in the control circuit 4 of FIG. 8 detects and determines the states of SW1 and SW2 as shown in FIG. 13. When SW2 is turned on in this state, the initialization (charge reset operation) at the time of detection of on is ended and thereafter the exposure mode is started. Also, the present embodiment is arranged to perform in the exposure mode reading of charges including optical information [Read Sensors] 907, then reading of data for correction of fixed pattern noise (FPN) as indicated by Get FPN or [Get FPN Data] 1003 in FIG. 12A or FIG. 13, and further reading of data for correction of gain dispersion as indicated by Get GN or [Get GAIN Data] 1004 in FIG. 12A or FIG. 13. It is, however, noted that these subsequent operations are also the same as to the operation of the sensor section as the reading of charges including optical information [Read Sensors] 907. In these reading operations, charges are read in the dark state (i.e., in a state without irradiation of X-rays) and charges of information of reference light radiated are read by some method. The information of reference light can be obtained, for example, by emitting radiations such as X-rays without setting the detected body and reading charges thereupon.

Namely, the feature of the imaging apparatus in the present embodiment is that the sensor section always repeats the same operation after the end of standby [Wait] 903 in the standby mode and before the end of the exposure mode. That the sensor section works to perform the same works periodically means that the parts inside the sensor section operate in the equilibrium state, which enables to obtain very stable image information at a good S/N ratio without odd transient response or the like. There are also significant effects to simplify the method of control and also to simplify the circuits. Further, during the standby [Wait] 903 the same operation can be performed practically as the reading operation of charges after exposure, [Read Sensors] 907.

Since the initialization [Initialize Sensors] 1002 is not started after on of SW2, the time to the exposure [Exposure] 906 is shortened, so that approximately the half of the time necessary for initialization is cut on average. This decreases the period (between a and b or between a' and b) necessary for the detected body such as the patient to stand still. Supposing the initialization of the sensor section normally ends in 30 to 300 ms and the pulse width of X-rays is 50 to 200 ms, the period necessary for the detected body to stand still is approximately 0.3 second on average. This is because the periodic charge reset operations or initialization operations are carried out in the standby mode so as to facilitate transfer to the exposure mode, which is a big feature of the present embodiment.

Figure 9B:
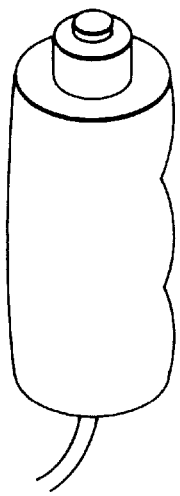
Figure 9C:
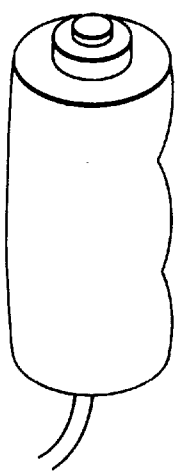

Further, the present embodiment has a timer in the control circuit as shown in FIG. 13, whereby even after SW1 is turned off, [Bias OFF], i.e., the stop mode is not effected for a predetermined period (five minutes in the present embodiment) after the end of the exposure mode. This keeps the stop mode from being effected within a certain period even if photography is not continuous. Thus, there is no need to perform standby [Wait] 903 upon next photography. If the structure such as the switch box 71 as described in FIG. 9A to FIG. 9C is employed, the stop mode will not be effected while the thumb leaves the switch, if it is for a short while. In other words, the present embodiment is arranged so that the control circuit interprets short off of SW1 (within five minutes, for example) as the operation being still under way, thus determining that the switch is not in the non-operative condition. This prevents the stop mode from being activated as long as photography continues to some extent without necessitating perfect continuation, and the standby state [Wait] 903 is not necessary upon next photography. After SW1 is kept off for the certain time (at least five minutes, for example), the control circuit automatically performs [Bias OFF] 909, that is, activates the stop mode. This further increases the efficiency while maintaining the high reliability, and also improves the operability. The present embodiment is also arranged to perform the control of [READY lamp ON/OFF] 1001, 1007 to indicate that the apparatus is ready for operation, thereby improving the operability.

Further, still another embodiment will be described referring to FIG. 14 to FIG. 19 and FIGS. 20A to 20C.

Figure 14:
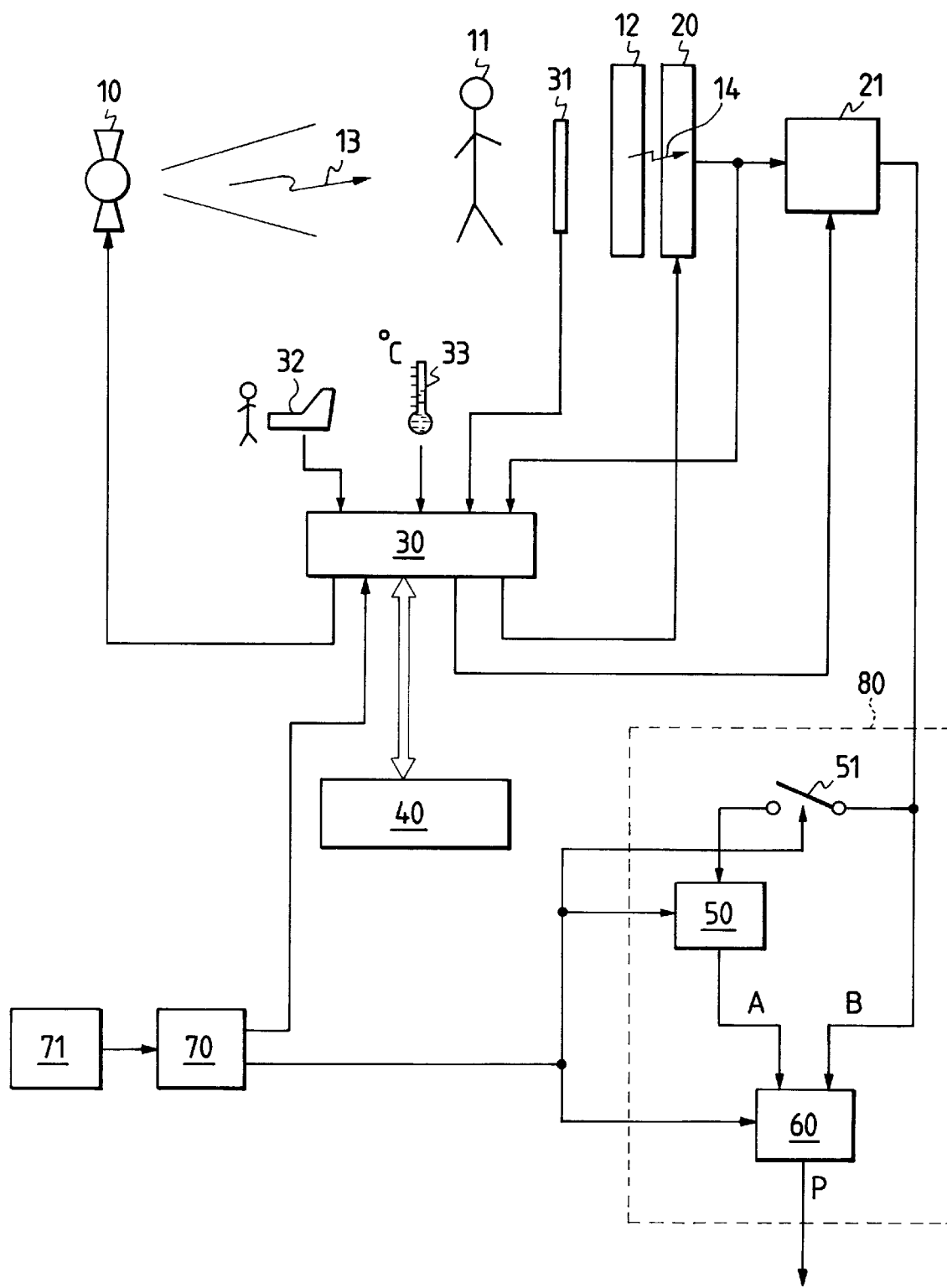
FIG. 14 is a schematic system block diagram for explaining an example of an imaging apparatus having the photoelectric conversion apparatus.

FIG. 14 is a total system block diagram of an imaging apparatus according to still another embodiment of the present invention. The present embodiment is constructed as a radiation imaging apparatus that can be used for medical X-ray diagnosis and non-destructive examination. In FIG. 14, reference numeral 10 designates an X-ray source that can emit X-rays 13 on a pulsed basis and an AE controller 30 serving as a photographing condition control means controls on/off of X-ray pulse, and the tube voltage and tube current of a tube in the X-ray source. The X-rays 13 emitted from the X-ray source 10 pass through the subject (detected body) 11 being a patient or a body as an object to be diagnosed or examined and the passing X-rays are incident to a fluorescent body 12 comprised of CsI, $Gd_2O_2S$, or the like. At this time the X-rays passing through the subject 11 are transmitted in different quantities depending upon the size and shape of bones and viscera inside the subject 11, upon presence or absence of focus, or upon differences of materials of constituent members, and they include image information thereof. The X-rays 13 are converted to visible light by the fluorescent body 12 and the visible light is incident as image information light 14 to a two-dimensional area sensor 20 acting as an imaging means. The two-dimensional area sensor 20 has a plurality of photoelectric conversion elements arrayed two-dimensionally and a driving circuit for driving them, and converts the image information light 14 to an electric signal including two-dimensional information. The two-dimensional area sensor 20 is controlled in the accumulation time of signal and in the drive speed by the AE controller 30. The output from the two-dimensional area sensor 20 is supplied to a gain adjusting circuit 21 and also as information for controlling the photographing conditions to the AE controller 30.

The AE controller 30 also receives supply of outputs from a control panel 32, a temperature sensor 33, and a phototimer 31 in order to control the photographing conditions. The control panel 32 has such an arrangement that the doctor or technical expert manipulates the panel to input conditions to achieve an optimum photographic output every photographing exposure in consideration of symptom, conformation, and age of patient, the size and thickness of object, or information desired to obtain and that the conditions are converted to an electric signal to be input into the AE controller 30. The temperature sensor 33 detects the temperature of a room upon photographing exposure, the temperature of the tube, and the temperature of components which change characteristics and optimum operating conditions depending upon the temperature, such as the two-dimensional area sensor 20, and supplies the temperatures to the AE controller 30. These detected temperatures are preferably those at the time of just photographing exposure. The phototimer 31 is located, for example, at an arbitrary position between the subject 11 and the two-dimensional area sensor 20, detects the quantity of X-rays passing through a reference portion (for example, an alveolar portion) of the subject 11 during photographing exposure, and supplies it to the AE controller 30. Since the phototimer 31 absorbs little X-rays, it rarely negatively affects the photographing exposure. The AE controller 30 automatically controls and sets the X-ray pulse width of the X-ray source 10, the accumulation time and drive speed of the two-dimensional area sensor 20, and the amplification factor of the gain adjusting circuit 21, based on values of these inputs immediately before the photographing exposure or values thereof during the photographing exposure. These controls permit the output from the gain adjusting circuit 21 to be set to an appropriate photographing output.

Also, the control and set conditions upon the photographing exposure by the AE controller 30 can be stored as condition values in a condition memory circuit 40 serving as a condition storing means at this time. This condition memory circuit 40 can store the conditions and can also supply the condition values stored to the AE controller 30. At this time the AE controller 30 can control and set the X-ray source 10, two-dimensional area sensor 20, and gain adjusting circuit 21, based on the condition values supplied from the condition memory circuit 40, to operate them. This means that a photographing exposure can be performed again under the same control and setting as the past photographing exposure conditions. On this occasion part of conditions, and control and setting can be changed to perform corrected exposure, whereby the output from the gain adjusting circuit 21 can be a corrected output. Namely, when the system operates under the same conditions as upon the previous photographing exposure except for no emission of X-ray pulse, a correction output of the dark-time output of the two-dimensional area sensor 20 can be obtained.

In FIG. 14, a block inside the dashed line of 80 indicates a correction circuit, in which a frame memory 50 as a photographing output storing means can record a photographing output obtained upon photographing exposure once through a switch 51 and in which an arithmetic process circuit 60 can process the photographing output with correction output B obtained upon correction exposure and photographing output A stored in the frame memory 50 to obtain an image information output P excluding errors upon photography. This image information output P is transmitted to an image processing system or the like.

Numeral 70 is a system control circuit, which detects depression of SW1 and SW2 in the switch box 71 as shown in FIG. 9A to FIG. 9C, controls the X-ray source 10, two-dimensional area sensor 20, and gain adjusting circuit 21 through the AE controller 30, though not illustrated, to perform photographing exposure or correction exposure, and controls the switch 51, frame memory 50, and arithmetic process circuit 60 to operate them as the correction circuit 80.

Figure 15:
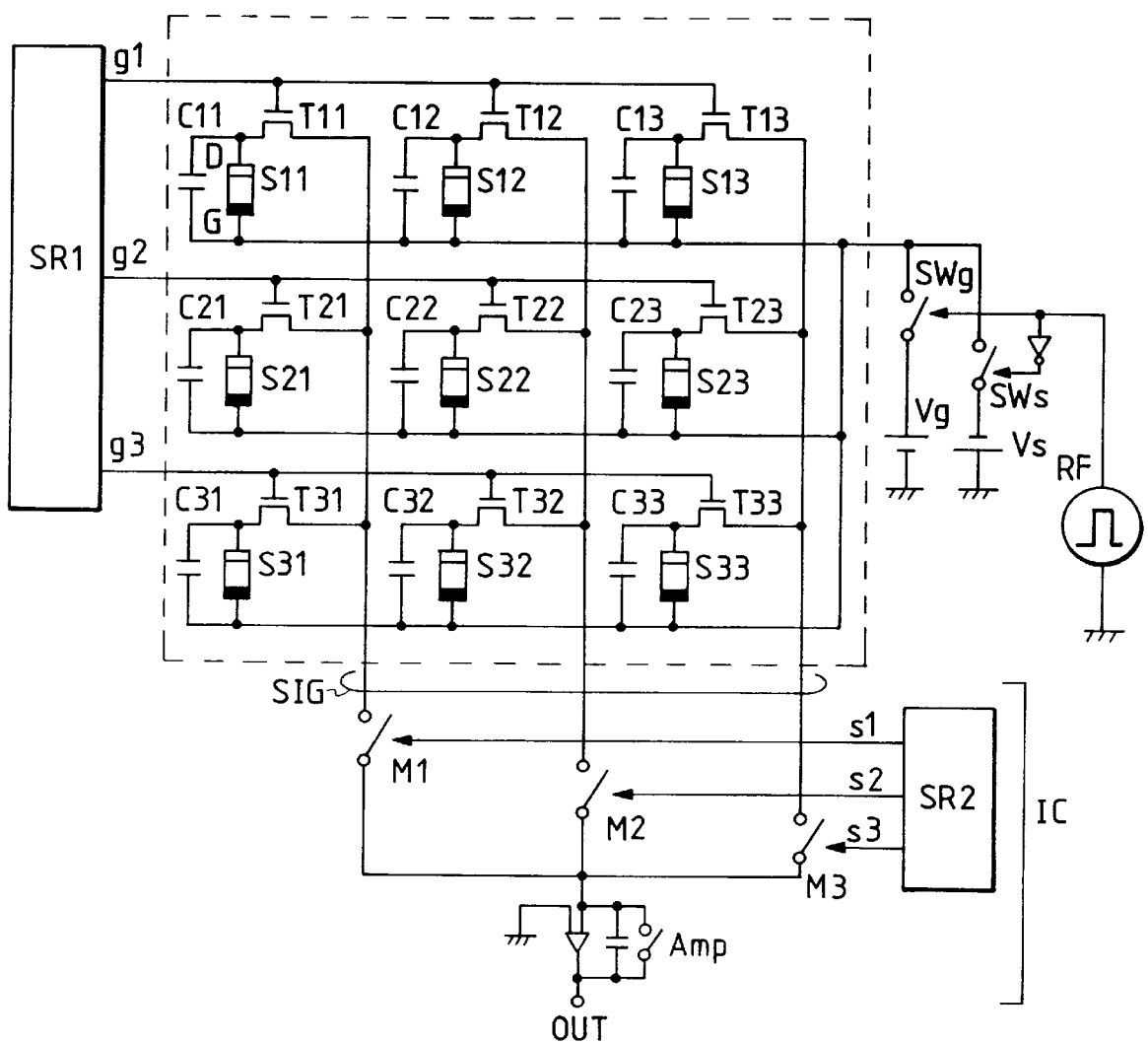
FIG. 15 is a schematic total circuit diagram for explaining an example of the photoelectric conversion section.
Figure 16A:
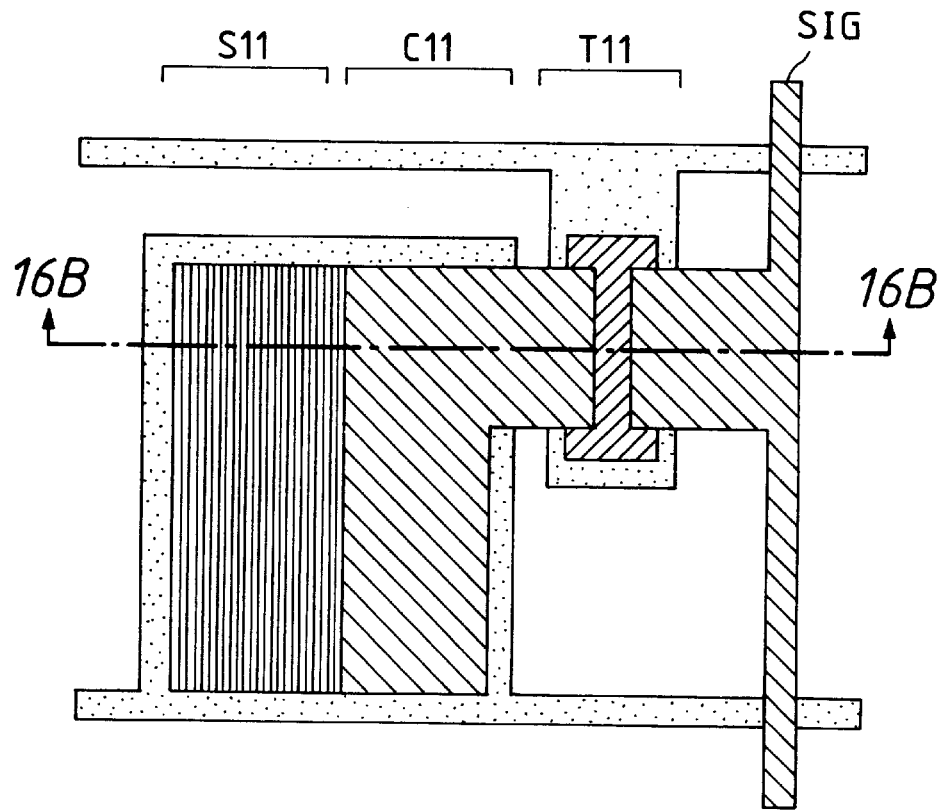
FIG. 16A is a schematic plan view for explaining an example of a pixel in the photoelectric conversion section.
Figure 16B:
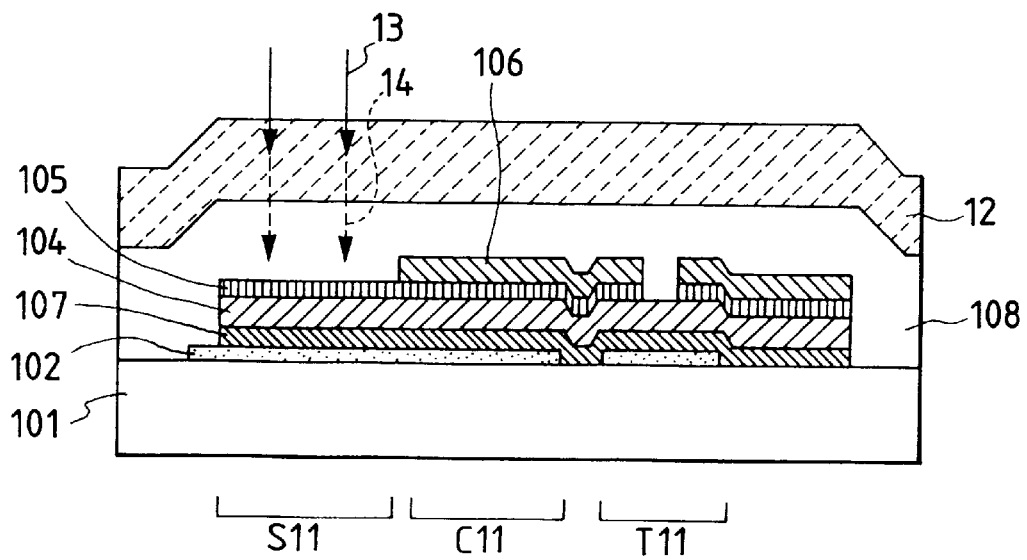
FIG. 16B is a schematic cross-sectional view for explaining an example of a pixel in the photoelectric conversion section.

FIG. 15 is a schematic total circuit diagram to show an example of the configuration of the two-dimensional area sensor 20 and FIG. 16A and FIG. 16B are a schematic plan view and a schematic cross-sectional view of each component corresponding to one pixel in the two-dimensional area sensor 20. Portions with the same functions as those in FIG. 14 are denoted by the same characters. In FIG. 15, S11 to S33 indicate photoelectric conversion elements the lower electrode side of which is denoted by G and the upper electrode side of which by D. C11 to C33 denote capacitors for accumulation and T11 to T33 TFTs for transmission. Vs is a reading power supply and Vg a refreshing power supply. Each power supply is connected through a switch SWs, SWg to the G electrodes of the all photoelectric conversion elements S11 to S33. The switch SWs is connected through an inverter to a refresh control circuit RF and the switch SWg is also connected to the refresh control circuit RF. SWg is on during a refresh period while SWs is on during the other periods. A pixel is comprised of one photoelectric conversion element, one capacitor, and one TFT and a signal output thereof is connected to a detection integrated circuit IC by signal wire SIG. The two-dimensional area sensor of the present embodiment is comprised of three blocks including nine pixels in total, it simultaneously transmits outputs of three pixels per block, and the detection integrated circuit receives the outputs through the signal wires to convert them to outputs in order and output them. Further, the three pixels in one block are arranged horizontally and the three blocks are arranged vertically in order, thereby arranging the pixels two-dimensionally.

In the drawing the portion surrounded by the dashed line can be formed on a same insulating substrate of a large area, among which FIG. 16A shows a schematic plan view of a portion corresponding to the first pixel. S11 is the photoelectric conversion element, T11 the TFT (thin film transistor) being a switch element, C11 the capacitor as a charge accumulating element, and SIG the signal wire. In the present embodiment, the capacitor C11 and photoelectric conversion element S11 are not isolated from each other by extra device isolation, but the capacitor C11 is formed by increasing the area of the electrodes of the photoelectric conversion element S11. This is possible because the photoelectric conversion element and capacitor of the present embodiment have the same layer structure, which is also a feature of the present embodiment. A schematic cross-sectional view of the part indicated by the dashed line A-B in the drawing is shown in FIG. 16B. In the upper part of pixel there are formed a silicon nitride film SiN 108 for passivation and a fluorescent body 12 of CsI, $Gd_2O_2S$, or the like. When X-rays 13 including image information are incident from above to the fluorescent body 12, the fluorescent body 12 converts them to image information light 14 and this light is incident to the photoelectric conversion element.

Now described in order is an example of the method for forming each element in the structure shown in FIG. 16A and FIG. 16B.

First, Cr is deposited in the thickness of about 500 Å as a lower metal layer 102 on a glass substrate 101 as an insulating material by sputtering or the like, and thereafter the layer is patterned by photolithography to etch unnecessary areas. This forms the lower electrode of photoelectric conversion element S11, the gate electrode of TFT T11, and the lower electrode of capacitor C11.

Next, SiN layer (107)/i-type semiconductor layer (104)/n-type semiconductor layer (105) are deposited each in about 2000 Å/5000 Å/500 Å in a same vacuum by the CVD. These layers become insulating layer/photoelectric conversion semiconductor layer/hole injection preventing layer of photoelectric conversion element S11, gate insulating film/semiconductor layer/ohmic contact layer of TFT T11, and intermediate layer of capacitor C11. They can also be used as an insulating layer of cross part of signal wire. Without having to be limited to the above values, the thickness of each layer can be designed optimally depending upon the voltage, electric current, charge, quantity of incident light, and so on used in the two-dimensional area sensor, but the SiN layer needs to have the thickness that can prevent electrons and holes from passing therethrough and that can function as a gate insulating film of TFT, generally 500 or more Å.

After deposition of the layers, Al is deposited in about 10000 Å as an upper metal layer 106 by sputtering or the like. Further, the layer is patterned by the photolithography to etch unnecessary areas, thereby forming the upper electrode of photoelectric conversion element S11, the source electrode and drain electrode being the main electrodes of TFT T11, the upper electrode of capacitor C11, and the signal wire SIG.

Further, only the channel part of TFT T11 is subjected to etching of the n-layer by the RIE (reactive ion etching) process and thereafter the SiN layer (107)/i-type semiconductor layer (104)/n-type semiconductor layer (105) of unnecessary portions are etched to isolate the respective elements. This completes the photoelectric conversion element S11, TFT T11, and capacitor C11. The foregoing described the first pixel, but the other pixels are also formed at the same time, of course.

In order to enhance durability, the upper part of each element is usually covered by the passivation film 108 of SiN or the like and the fluorescent body 12 of CsI, $Gd_2O_2S$, or the like is further formed thereon.

As explained above, in the present embodiment the photoelectric conversion element, TFT, capacitor, and signal wire SIG can be formed only by the common lower metal layer 102, SiN layer (107)/i-type semiconductor layer (104)/n-type semiconductor layer (105), and upper metal layer 106 each deposited at one time and by etching of each layer. Also, the injection preventing layer exists only at one position in the photoelectric conversion element S11 and can be formed in the same vacuum. Further, since the interface between the gate insulating film and the i-layer, which is significant in respect of the characteristics of TFT, can also be formed in the same vacuum, it is easy to achieve desired performance. In addition, since the intermediate layer of capacitor C11 includes the insulating layer with little leak due to heat, the capacitor can be formed with good characteristics.

Figure 17A:
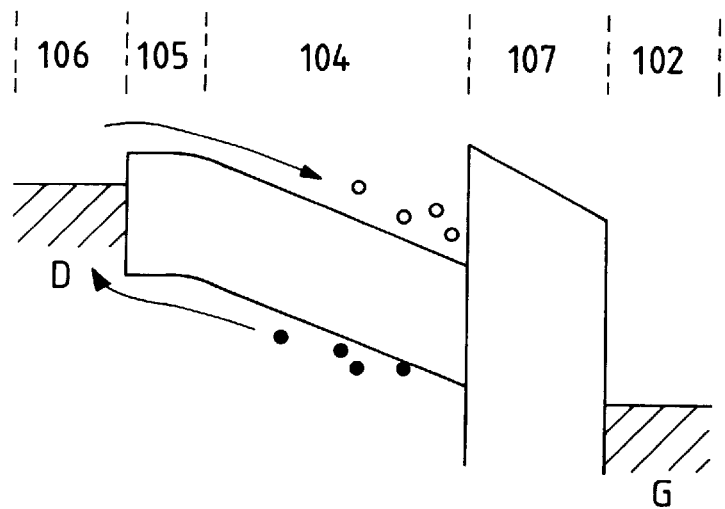
FIGS. 17A, 17B and 17C are schematic energy band diagrams of photoelectric conversion element.
Figure 17B:
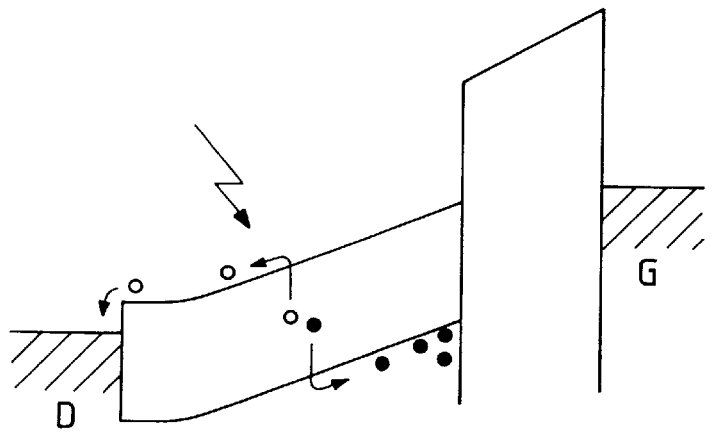

Now described is the operation of the photoelectric conversion elements S11 to S33 used in the present embodiment. FIG. 17A and FIG. 17B are schematic energy band diagrams of photoelectric conversion element to show the operation in a refresh mode (initialization mode) and the operation in a photoelectric conversion mode, respectively, in the present embodiment, which show states in the thickwise direction of the respective layers of FIG. 16B. Numeral 102 denotes the lower electrode (hereinafter referred to as G electrode) made of Cr. Numeral 107 represents the insulating layer made of SiN for preventing the both electrons and holes from passing therethrough and the thickness thereof is set to be a thickness that can prevent the electrons and holes from moving therethrough by the tunnel effect, specifically 500 or more Å. Numeral 104 is the photoelectric conversion semiconductor layer made of an intrinsic semiconductor i-layer of hydrogenated amorphous silicon (a-Si), 105 the injection preventing layer of n-type a-Si for preventing the holes from being injected into the photoelectric conversion semiconductor layer 104, and 106 the upper electrode (hereinafter referred to as D electrode) made of Al. In the present embodiment the D electrode does not cover the n-layer completely, but movement of electron is free between the D electrode and the n-layer. Thus, the D electrode and the n-layer are always at the same potential, which the following description assumes as a premise. This photoelectric conversion element has two types of operations in the refresh mode and in the photoelectric conversion mode, depending upon how to apply the voltage to the D electrode and to the G electrode.

In the refresh mode shown in FIG. 17A, a negative potential is given to the D electrode with respect to the G electrode and the holes indicated by dots in the i-layer 104 are guided to the D electrode by the electric field. At the same time, the electrons indicated by circles are injected into the i-layer 104. At this time some holes and electrons are recombined in the n-layer 105 and i-layer 104 to annihilate. If this state continues for a sufficiently long time, the holes in the i-layer 104 will be swept away from the i-layer 104.

For changing this state into the photoelectric conversion mode shown in FIG. 17B, a positive potential is given to the D electrode with respect to the G electrode. Then, the electrons in the i-layer 104 are guided momentarily to the D electrode. However, since the n-layer 105 serves as an injection preventing layer, the holes are not guided into the i-layer 104. If light is incident into the i-layer 104 in this state, the light will be absorbed to generate electron-hole pairs. These electrons are guided to the D electrode by the electric field while the holes migrate in the i-layer 104 to reach the interface between the i-layer 104 and the insulating layer 107. However, because they cannot move into the insulating layer 107, they remain in the i-layer 104. Since at this time the electrons move to the D electrode while the holes move to the interface to the insulating layer 107 in the i-layer 104, an electric current flows from the G electrode in order to keep the electrically neutral state in the element. This electric current is according to the electron-hole pairs generated by the light and thus is proportional to the incident light. After the photoelectric conversion mode of FIG. 17B is maintained for a certain period and when the state is changed again to the refresh mode of FIG. 17A, the holes having stayed in the i-layer 104 are guided toward the D electrode as described above, so that an electric current according to the holes flows at the same time. The amount of the holes corresponds to the total quantity of the incident light in the photoelectric conversion mode. Although the electric current corresponding to the quantity of electrons injected into the i-layer 104 also flows at this time, this quantity is almost constant and thus, detection can be done with subtraction of the quantity. Namely, the photoelectric conversion elements S11 to S33 in the present embodiment can output the quantity of incident light in real time and can also output the total quantity of incident light in a certain period. This is a significant feature of the photoelectric conversion elements of the present embodiment.

Figure 17C:
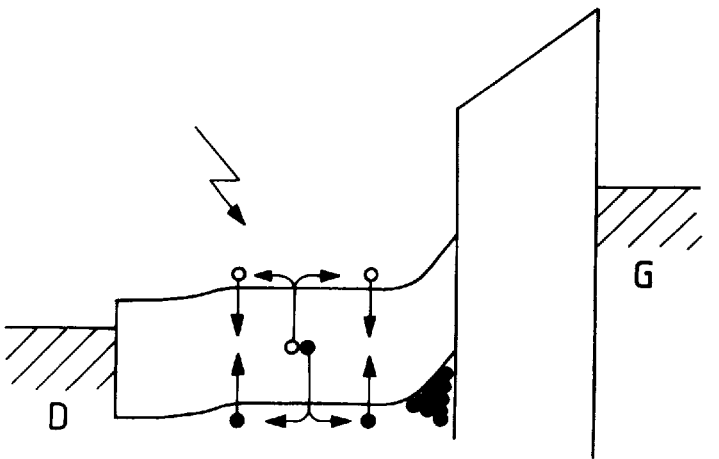

However, if the period of the photoelectric conversion mode becomes longer or if the illuminance of the incident light is too strong for some reason, there would be some cases in which the electric current does not flow even with incidence of light as in D. This is because many holes stay in the i-layer 104, the holes weaken the electric field in the i-layer 104 to stop guide of generated electrons to the D electrode, and the electrons are recombined with the holes in the i-layer 104, as shown in FIG. 17C. If the state of incidence of light is changed in this condition, an unstable electric current could flow in some cases. However, when the state is changed again to the refresh mode, the holes in the i-layer 104 are swept away and an electric current proportional to light can be obtained again in the next photoelectric conversion mode.

In the foregoing description, when the holes in the i-layer 104 are swept away in the refresh mode, the all holes are swept away ideally, but sweeping of part of the holes is also effective to obtain the electric current equal to that described above without any problem. This means that the element needs to be prevented from being in the state of FIG. 17C on the occasion of detection in the next photoelectric conversion mode and it is thus necessary to determine the potential of the D electrode relative to the G electrode in the refresh mode, the period of the refresh mode, and the characteristics of the injection preventing layer of the n-layer 105. Further, injection of electrons into the i-layer 104 in the refresh mode is not a necessary condition, and the potential of the D electrode relative to the G electrode is not limited to negative values. The reason is as follows. If many holes stay in the i-layer 104 and even if the potential of the D electrode relative to the G electrode is positive, the electric field in the i-layer will be applied in the direction to guide the holes to the D electrode. Similarly, as to the characteristics of the injection preventing layer of the n-layer 105, capability of injecting the electrons into the i-layer 104 is not a necessary condition, either.

Figure 18:
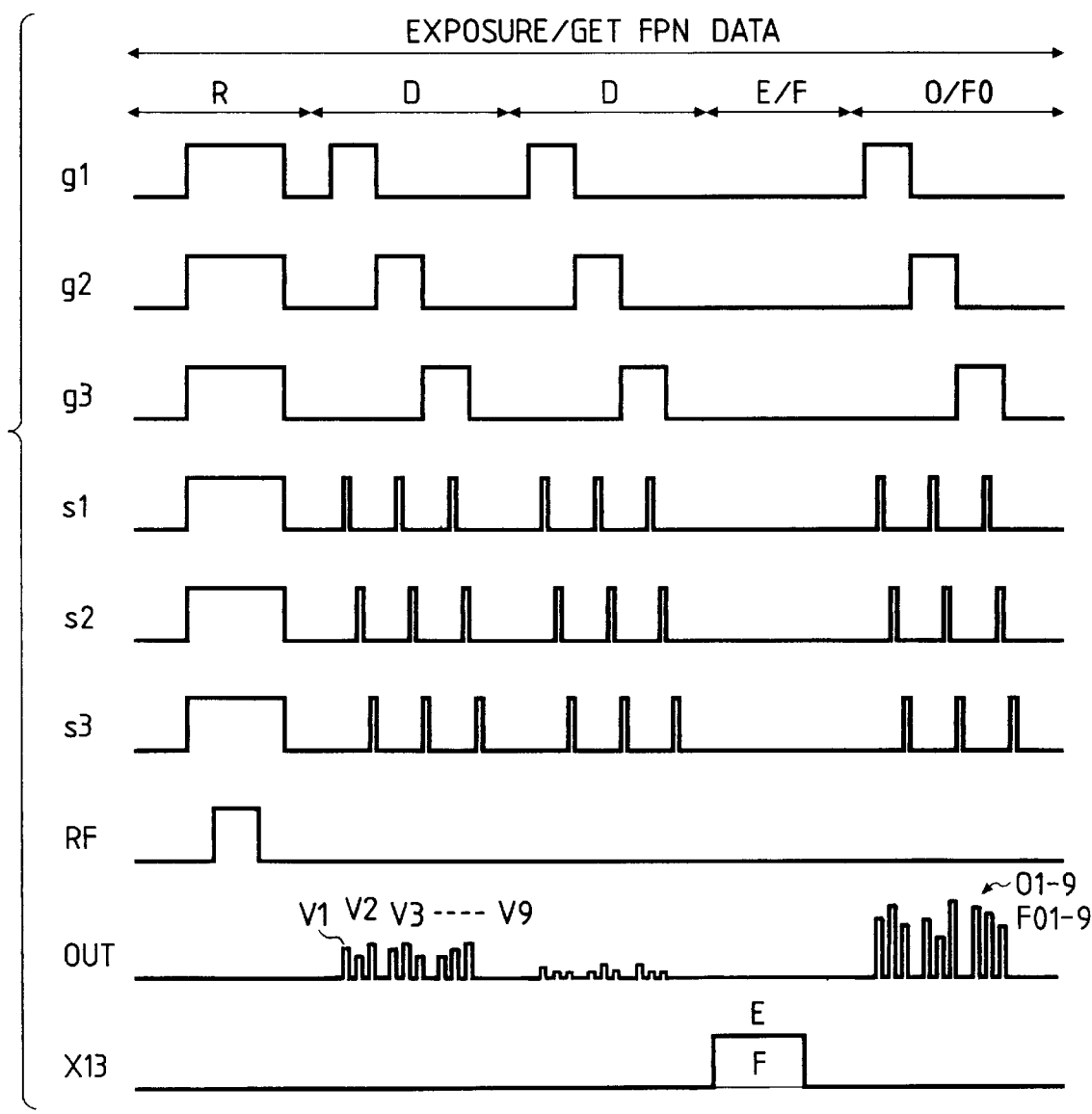
FIG. 18 is a schematic timing chart for explaining an example of drive and output of the photoelectric conversion apparatus.

An example of the operation of the radiation imaging apparatus of the present embodiment is next described using FIG. 14, FIG. 15, and FIG. 18 to FIG. 20. As in the previous description, the photoelectric conversion element in the present embodiment will operate as a photosensor for outputting a photocurrent proportional to the incident light in the photoelectric conversion mode if refreshed at regular intervals. FIG. 18 is a timing chart to show the reading operation of optical information and the data reading operation for FPN correction in the exposure mode of the present embodiment. First described is the reading operation [Exposure] of optical information.

First, the system control circuit 70 subjects the two-dimensional area sensor 20 to the refresh operation expressed by R in the upper part in FIG. 18. The refresh operation is described here. Shift registers SR1 and SR2 shown in FIG. 15 first apply Hi to the control wires g1 to g3 and s1 to s3. Then the transferring TFTs T11 to T33 and switches M1 to M3 become on to let the current flow and to change the D electrodes of the all photoelectric conversion elements S11 to S33 to the GND potential (because the input terminal of integration detector Amp is designed to take the GND potential herein). At the same time, the refresh control circuit RF outputs Hi to turn the switch SWg on and the refreshing power supply Vg changes the G electrodes of the all photoelectric conversion elements S11 to S33 to a positive potential. Then the all photoelectric conversion elements S11 to S33 go into the refresh mode to be refreshed. Then the refresh control circuit RF outputs Lo to turn the switch SWs on and the reading power supply Vs changes the G electrodes of the all photoelectric conversion elements S11 to S33 to a negative potential. Then the all photoelectric conversion elements S11 to S33 go into the photoelectric conversion mode and the capacitors C11 to C33 are initialized at the same time. In this state the shift registers SR1 and SR2 apply Lo to the control wires g1 to g3 and s1 to s3. Then the transferring TFTs T11 to T33 and switches M1 to M3 become off, and the D electrodes of the all photoelectric conversion elements S11 to S33 become open on a DC basis, but the potential is maintained by the capacitors C11 to C33. However, since no X-rays are incident at this point, no light is incident to any photoelectric conversion elements S11 to S33, so that no photocurrent flows therein. This completes the refresh operation (R).

Next, the two-dimensional area sensor 20 performs dummy reading operation expressed by D in the upper part in FIG. 18. The reason thereof is that the dark current also flows because of the change of the G electrodes of photoelectric conversion elements S11 to S33 from the same reason as the dark current flows upon on of bias application thereto as described in the previous example. This current, however, can be decreased to some extent by the potential and direction of the refreshing power supply Vg and the pulse width of Hi of RF, when compared with the electric current flowing upon application of bias from the electric field of 0. Since the dark current is not zero completely, execution of dummy reading will decrease the dark current by a small Wait effect. This operation is equivalent to charge reading of optical information described hereinafter. The shift register SR1 applies the control pulse of Hi to the control wire g1 and the shift register SR2 applies the control pulse to the control wires s1 to s3, whereby v1 to v3 are successively output through the transmitting TFTs T11 to T13 and switches M1 to M3. Similarly, by control of the shift registers SR1, SR2, charges of the other photoelectric conversion elements are also output up to v9 in order (OUT). However, these outputs of v1 to v9 are not used. The outputs are not used in this dummy reading operation. This dummy reading has a role of resetting the charges due to the dark current with change of the G electrodes of photoelectric conversion elements S11 to S33 described previously and has the same effect as Wait shown in FIG. 10A because this dark current is damped as shown in FIG. 10D. Therefore, the negative effect of the dark current can be decreased by increasing the number of dummy readings. Also taking operability into consideration, the present embodiment is arranged to perform this dummy reading twice.

After that, irradiation of X-ray pulse expressed by E in FIG. 18 is carried out (X13). At this time the two-dimensional area sensor 20 keeps the transferring TFTs T11 to T33 off. In this state the X-ray source 10 emits the X-ray pulse 13. Then a photocurrent flowing due to light of a certain determined quantity is accumulated as a charge in each of the capacitors C11 to C33, and the charges are maintained even after the end of incidence of X-rays.

Then carried out is reading of the charges including optical information as expressed by O1-9 (OUT). The operation of the two-dimensional area sensor 20 is the same as in the dummy reading, but the outputs thereof include optical information, i.e., two-dimensional information of internal structure of the detected body such as the human body, which are denoted by O1–9. As described, the exposure operation [Exposure] of the two-dimensional area sensor 20 of the present embodiment is a combination of operations of initialization—dummy reading—dummy reading—exposure—reading (R-D-D-E-O) when expressed finely.

In contrast with it, the FPN correction data reading operation indicated by [Get FPN Data] in Exposure Mode upon setting in the exposure mode includes the same operations as the reading operation of optical information [Exposure] and the operation of two-dimensional area sensor 20. However, X-rays are not emitted as shown by F in X13. The operation at this time is expressed by F and the operation for outputting outputs FO1-9 including information of FPN by FO. Namely, the FPN correction data reading operation indicated by [Get FPN Data] is a combination of operations of initialization—dummy reading—dummy reading—non-exposure state—reading (R-D-D-F-FO).

Figure 19:
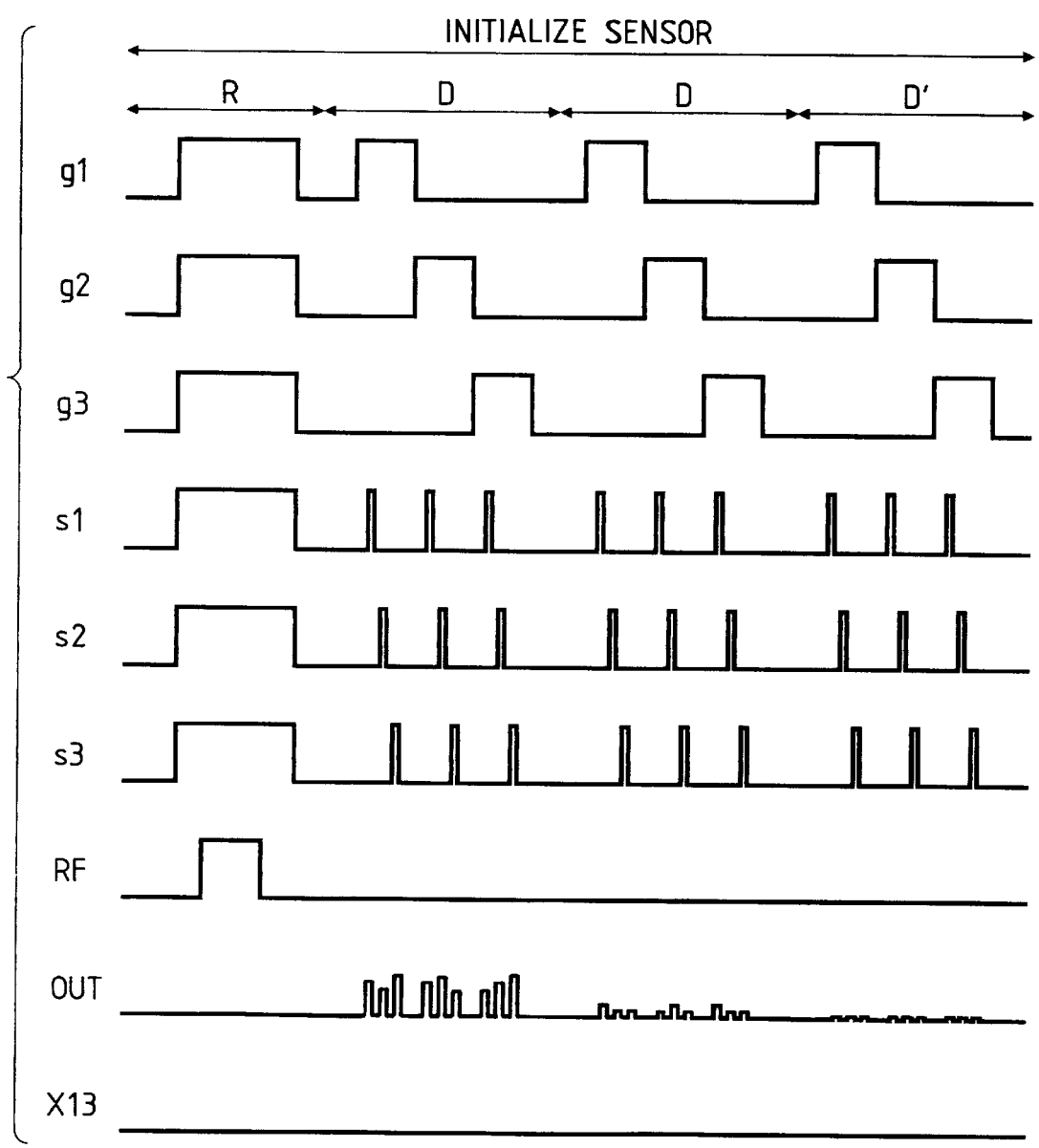
FIG. 19 is a schematic timing chart for explaining an example of drive and output of the photoelectric conversion apparatus.

FIG. 19 shows an example of the initialization operation [Initialize Sensor] in the standby mode. The operation is the same as the exposure operation [Exposure] of FIG. 18 except for absence of the X-ray pulse irradiation period E. The outputs are not used, either. The initialization operation indicated by [Initialize Sensor] is a combination of operations of R-D-D-D'. This initialization operation is not carried out only once, but can also be repeated periodically several times, which can reset unnecessary charges due to the dark current flowing in the photoelectric conversion elements, thereby making a good condition upon next exposure operation. It is thus preferable that in the standby mode this initialization operation be carried out periodically so as to reset the charges of photoelectric conversion elements periodically.

Now, an example of the operation of the entire system of the present embodiment is described referring to FIG. 14, FIG. 15, and FIG. 20A to FIG. 20C. Three types of operations of the two-dimensional area sensor 20, for example, as shown in FIG. 20A, FIG. 20B, and FIG. 20C, are typically considered. The operation of FIG. 20A is described first. For the non-operative period the two-dimensional area sensor 20 is in the stop mode and no electric field is applied to the photoelectric conversion elements. First, the doctor or technical expert positions the detected body as an object of examination, i.e., the subject 11 between the X-ray source 10 and the two-dimensional area sensor 20 and makes the subject pose or located so as to permit observation of a portion desired to examine. When the pose or location is almost set, SW1 in the switch box 71 is turned on. Then the two-dimensional area sensor 20 transfers to the standby mode. At the same time, conditions are input through the control panel 32 so as to obtain an optimum photographing output, taking account of the symptom, conformation, and age of patient obtained by doctor's questions or the like, the composition and size of object, or information of detected body desired to obtain. This signal is an electric signal, which is transmitted to the AE controller 30. At the same time, these conditions are stored in the condition memory circuit 40.

When in this state the doctor or technical expert depresses SW2 in the switch box 71 after confirming on of [READY lamp] in the control panel 32, the end of the initialization operation [Initialize Sensor] under way at that time is awaited and after completion thereof the system goes into the exposure mode to start the exposure operation [Exposure] first. At this time the temperature sensor 33 detects the temperature of the room upon photographing exposure, the temperature of the tube, and the temperature of the components that change characteristics depending upon the temperature to change the optimum operation conditions, such as the two-dimensional area sensor 20, and it supplies them to the AE controller 30. These detected temperatures are just those immediately before execution of photographing exposure. At the same time, these temperatures are stored as conditions in the condition memory circuit 40.

Here, the AE controller 30 determines the initial conditions in the exposure operation, based on the information from the control panel 32 and the information from the temperature sensor 33. At the same time, these initial conditions are stored in the condition memory circuit 40. The contents of the initial conditions include the voltage, current, and maximum pulse width of the tube of the X-ray source 10, and the drive speed of the two-dimensional area sensor 20. For example, if the chest or a thick part of the object is set through the control panel 32, the voltage of the tube of the X-ray source 10 will be set high; if the abdomen or a thin part of the object is set, it will be set low. If the control panel 32 instructs that the patient is a child or a pregnant woman or a structural material possibly affected by X-rays, the end condition by the phototimer 31 will be set short and the maximum pulse width will also be set narrow. If the temperature of the two-dimensional area sensor 20 is high, the optimum conditions will be set so as to increase the drive speed to lower accumulation of dark current and to prevent lowering of S/N, because the dark current of photoelectric conversion element is high and because the performance of TFT is high. Conversely, if the temperature is low, the drive speed will be lowered to suppress deformation of image due to decrease of transfer of charges of TFT, because the performance of TFT is low and because the dark current of photoelectric conversion element is also low.

Under such initial conditions the X-rays are emitted at the timing E in FIG. 20A to FIG. 20C and pass through the subject 11 to enter the fluorescent body 12. Then the X-rays are converted to light and the light is incident to the respective photoelectric conversion elements S11 to S33. At the same time, the X-rays are also incident to the phototimer 31 positioned between the subject 11 and the two-dimensional area sensor 20. These beams of light include information of the internal structure of the human body or the like. The output from the phototimer 31 is input to the AE controller 30 at all times. When integral of the output exceeds a constant value determined by the initial conditions, the AE controller 30 stops the X-rays. This results in obtaining an optimum exposure dose in the exposure operation. If the maximum pulse width determined by the initial conditions is achieved, the AE controller 30 will stop the X-rays independently of the photosensor 31. At this time the condition memory circuit 40 stores the pulse width of actually emitted pulse as an exposure time.

The outputs O1–9 including optical information at this time are put into the gain adjusting circuit 21 and also into the AE controller 30. The AE controller 30 always determines the gain for converting these outputs to appropriate values, makes the condition memory circuit 40 store that value of gain, and, at the same time, gives it to the gain adjusting circuit 21. This changes the output of the gain adjusting circuit to an optimum photographing output for processing them later. This photographing output is once recorded in the frame memory 50 as a photographing output storing means through the switch 51 controlled by the system control circuit 70.

As described above, the AE controller 30 automatically controls the X-ray source 10, two-dimensional area sensor 20, and gain adjusting circuit 21 almost in real time, based on setting and outputs of the control panel 32, temperature sensor 33, phototimer 31, and two-dimensional area sensor 20, so that it can attain the photographing output under various conditions almost optimal. This completes the exposure operation.

Next, the system control circuit 70 enters the FPN correction data reading operation to subject the two-dimensional area sensor 20 again to the refresh operation and dummy reading. At the same time, the system control circuit 70 calls the various conditions stored in the condition memory circuit 40 upon the exposure operation into the AE controller 30. The components other than the X-ray source 10 are operated under the exactly same conditions as upon the exposure operation. Namely, they are operated based on the values stored in the condition memory circuit 40 without using the outputs from the temperature sensor 33 and from the phototimer 31. The X-ray source 10 is not operated in the correction mode so as to emit no X-rays. However, though the X-ray source 10 is not operated, the two-dimensional area sensor 20 starts the reading operation after waiting for a period corresponding to the exposure time in the photographing mode. The drive speed and the gain of gain adjusting circuit 21 are the same as those in the photographing mode, thereby obtaining the outputs FO1–9 including information of FPN. The output of the gain adjusting circuit 21 at this time is defined as a correction output. Namely, the correction output can be obtained by setting and controlling the X-ray source 10, two-dimensional area sensor 20, and gain adjusting circuit 21 to the values stored in the condition memory circuit 40.

This correction output is an output reflecting the electric current in the dark period (or in the non-irradiated period) of each pixel, the fixed pattern noise upon transfer, offset voltages of an internal amplifier of the two-dimensional area sensor 20 and the gain adjusting circuit 21, and so on. Since this correction output is of the same accumulation period as upon the exposure operation, an influence amount due to accumulation of current in the dark period is also the same. In addition, since this correction output is also of the same drive speed, an influence amount of fixed pattern due to influence of clock leak or the like is also the same. Further, since the gain is also the same, an influence amount of offset voltage is also the same. Namely, since the operations in the photographing mode and in the correction mode are completely the same except for the X-ray source thanks to the condition memory circuit 40, all influence amounts not preferable for photography except for emission or non-emission of X-rays are the same, as well as the influence amounts described previously. Accordingly, the correction output includes only the unpreferred errors in the same amounts in the photographing output.

Therefore, letting A be the photographing output stored in the frame memory 50 and B be the correction output obtained in the correction mode, the arithmetic process circuit 60 performs a subtraction process to calculate P=A−B, thereby obtaining a good image information output P as removing the errors of fixed pattern and the like from the photographing output obtained in the photographing mode. For simplification of description, it was described with the simple equation (P=A−B) herein. It is thus noted that the method of correction is not limited to this, but may be modified with necessity.

The operation of transition from the standby mode through on of SW2 to the exposure mode may also be performed preferably by the other operation methods shown in FIG. 20B and FIG. 20C. FIG. 20B shows an example in which the initialization operation is forcibly stopped at the time (*) when SW2 becomes on and in which then the exposure operation is started. FIG. 20C shows an example in which unless the second dummy reading of initialization operation has been finished at the time of on of SW2, X-rays are emitted after completion of two dummy readings to effect the exposure operation. In the cases wherein the detected body such as the patient needs to stand still, the period thereof (between a and b) can be shorter in FIG. 20B than in FIG. 20A and shorter in FIG. 20C than in FIG. 20B. However, optimization with the other operations is easier and performance is easier to enhance in FIG. 20B than in FIG. 20C, and easier in FIG. 20A than in FIG. 20B, because the operation is carried out at the timing expected, independent of the timing of on of SW2, as to the transition. Namely, FIG. 20A includes the continuous initialization operation and exposure operation of the entire system, has no odd transient response, has the time margin in X-ray control, and permits an increase in the control number. FIG. 20B has the time margin in the X-ray control, permits an increase in the control number, and requires only a short time for stop of the detected body such as the patient. FIG. 20C includes the continuous initialization operation and exposure operation and no odd transient response in the panel operation and requires only a very short period for stop of the detected body such as the patient.

The two-dimensional area sensor of the present embodiment was described as the example wherein nine pixels were arranged in the two-dimensional array of 3×3, they were divided into three groups, and they were arranged so that outputs from each group of three pixels were simultaneously output and transmitted, but it is not limited to this example. For example, if 2000×2000 pixels are arranged two-dimensionally in the pixel size of 5×5 per 1 mm square, the two-dimensional area sensor of 40 cm×40 cm can be obtained and a radiation imaging apparatus can be constructed for the purposes of medical X-ray diagnosis and high-precision non-destructive examination. With such apparatus the output thereof can be displayed on a CRT momentarily, different from the film. Further, the output can be converted to a digital signal and then the digital signal can be subjected to image processing in a computer to be converted to any output depending upon the purpose. The data can also be stored in a storage means such as an optical disk or a magnetooptical disk, whereby a past image can be searched momentarily. In addition, clear images can also be obtained at higher sensitivity than that of the film and in a small X-ray dose little affecting the human body and environment.

The embodiments of the present invention were described above, but it should be noted that the present invention is by no means limited to these embodiments. For example, a still camera with an AE function can be attained by employing the flash device, the subject, and the lens as an image information input apparatus and mounting two switches to the shutter button. The natural light, subject, and lens may suffice without the flash device and in this case, a mechanical shutter may be provided before the photoelectric conversion elements so as to effect the exposure operation by opening it. Alternatively, the shutter may be a so-called electronic shutter to change the accumulation period by electric control so as to achieve the AE operation.

The sensor as an image pickup means does not have to be arranged two-dimensionally, but may be arranged one-dimensionally, that is, may be a one-dimensional line sensor. It is obvious that the same effects can be achieved by the one-dimensional line sensor.

Although it was described that no electric field was applied to the photoelectric conversion elements in the stop mode, the effects will appear as long as the electric field is decreased than in the other modes. In this case, as compared with the case without application of electric field, the dark current is smaller immediately after start of the standby mode, the sensitivity is higher with higher S/N ratios, and the wait [Wait] can be set shorter, thus providing the imaging apparatus with good operability.

As described above, according to the present invention, the voltage or electric current is supplied to the photoelectric conversion means by turning the switch means on to decrease the dark current and thereafter the switch means is again turned on, thereby enabling to start exposure quickly.

Namely, the present invention can provide the imaging apparatus with good operability that does not have to apply the electric field or the like always to the photoelectric conversion means, that has high reliability, that can utilize the photocurrent after decrease of the dark current, that can obtain image information with high S/N ratios without shot noise, and that can start exposure immediately after a desired image.

A combination with the X-ray source can provide the X-ray imaging apparatus for medical diagnosis or for non-destructive examination that can obtain digital signals with excellent reliability, sensitivity, and operability, in place of the silver-salt film, and the imaging apparatus permits appropriate diagnosis by the doctor or technical expert at a remote place.

What is claimed is:

1. A radiation image pick-up apparatus comprising:
   a plurality of photoelectric conversion elements;
   a drive circuit for driving the photoelectric conversion elements; and
   a control circuit for controlling said driving,
   wherein said control circuit generates signals for starting a first mode for applying a voltage to said photoelectric conversion elements, and for starting, after stabilizing a dark current component of said photoelectric conversion elements after an elapse of a predetermined period in said first mode, a second mode for driving said photoelectric conversion elements to obtain image information.

2. The radiation image pick-up apparatus according to claim 1, wherein said first mode is a standby mode and said second mode is an exposure mode.

3. The radiation image pick-up apparatus according to claim 1, comprising a switch for changeover between said first mode and said second mode.

4. The radiation image pick-up apparatus according to claim 3, wherein said switch has a first switch for selecting the first mode and a second switch for selecting the second mode.

5. The radiation image pick-up apparatus according to claim 3, comprising selecting means for selecting the first mode or the second mode in accordance with an input from said switch.

6. The radiation image pick-up apparatus according to claim 4, comprising selecting means for selecting the first mode or the second mode by determining an on or off state of said first switch and an on or off state of said second switch.

7. The radiation image pick-up apparatus according to claim 4, wherein a pressing force of a pressing portion of said first switch is set smaller than a pressing force of a pressing portion of said second switch.

8. The radiation image pick-up apparatus according to claim 1, comprising timer means for outputting a signal of start of said second mode.

9. The radiation image pick-up apparatus according to claim 1, wherein said first mode and said second mode are selected by a mechanical switch.

10. The radiation image pick-up apparatus according to claim 1, wherein said first mode and said second mode are selected by an electric circuit.

11. The radiation image pick-up apparatus according to claim 1, wherein said first mode and said second mode are selected by a combination of a mechanical switch with an electric circuit.

12. The radiation image pick-up apparatus according to claim 1, wherein said photoelectric conversion element has a first electrode, an insulating layer, a semiconductor layer, and a second electrode on a substrate.

13. The radiation image pick-up apparatus according to claim 12, wherein said semiconductor layer is electrically connected through an ohmic contact layer to the second electrode.

14. The radiation image pick-up apparatus according to claim 1, comprising switch elements corresponding to said photoelectric conversion elements.

15. The radiation image pick-up apparatus according to claim 14, wherein said switch elements are transistors.

16. The radiation image pick-up apparatus according to claim 14, comprising charge accumulating elements corresponding to said photoelectric conversion elements.

17. The radiation image pick-up apparatus according to claim 14, comprising charge accumulating elements corresponding to said switch elements.

18. The radiation image pick-up apparatus according to claim 1, wherein said control circuit outputs a signal for controlling exposure means.

19. The radiation image pick-up apparatus according to claim 18, wherein said exposure means comprises an X-ray source.

20. The radiation image pick-up apparatus according to claim 1, comprising a wavelength converting member provided on the entrance side of image information of said photoelectric conversion elements.

21. The radiation image pick-up apparatus according to claim 20, wherein said wavelength converting member comprises a fluorescent body.

22. The radiation image pick-up apparatus according to claim 1, wherein said photoelectric conversion element has an amorphous semiconductor layer.

23. The radiation image pick-up apparatus according to claim 22, wherein said amorphous semiconductor layer has hydrogenated amorphous silicon.

24. The radiation image pick-up apparatus according to claim 1, comprising a circuit for performing, in said first mode, a driving of the photoelectric conversion elements that is not related to output of image information.

25. The radiation image pick-up apparatus according to claim 24, comprising a circuit for, when the drive of the photoelectric conversion elements in said first mode comprises a predetermined set of operations, activating transition to the second mode after completion of said set of operations.

26. The radiation image pick-up apparatus according to claim 24, comprising a circuit for, when the drive of the photoelectric conversion elements in said first mode comprises a predetermined set of operations, activating transition to the second mode after ending said set of operations at that time.

27. A radiation image pick-up apparatus according to claim 1, further comprising means for producing a signal for starting the second mode, separate from an input signal for starting the first mode.

28. A radiation image pick-up apparatus according to claim 1, wherein the first mode is to initialize said photoelectric conversion elements.

29. A driving method of a radiation image pick-up apparatus having a photoelectric conversion section in which a plurality of photoelectric conversion elements are arrayed two-dimensionally, comprising:
   a first mode for applying a voltage to the photoelectric conversion elements; and
   a second mode for obtaining signal outputs carrying image information from the photoelectric conversion elements after a lapse of a desired time from the first mode such that, by means of the first mode, a dark current component of the photoelectric conversion elements is made stable.

30. The driving method according to claim 29, wherein said first mode comprises performing a driving of the photoelectric conversion elements that is not related to the output of image information.

31. The driving method according to claim 30, wherein said drive of the photoelectric conversion elements is performed a plurality of times.

32. The driving method according to claim 31, wherein said drive of the photoelectric conversion elements transitions to the second mode by a signal of start of the second mode after completion of a predetermined set of operations.

33. The driving method according to claim 31, wherein said drive of the photoelectric conversion elements transitions to the second mode by a signal of start of the second mode midway in the predetermined set of operations.

34. The driving method according to claim 29, wherein transition to the second mode is effected by a timer at a desired time after start of the first mode.

35. The driving method according to claim 29, wherein transition to the second mode is effected by a switch.

36. The driving method according to claim 29, wherein transition to the second mode is effected by another switch different from a switch for start of the first mode.

37. The driving method according to claim 29, wherein transition to the second mode is effected by the same switch as a switch for start of the first mode.

38. The driving method according to claim 29, wherein start of the first mode and start of the second mode are determined by detecting a number of inputs of a switch.

39. The driving method according to claim 29, wherein transition from said first mode to the second mode is inhibited for a predetermined period of time.

40. The driving method according to claim 29, comprising a step of performing display to indicate the ready of transition to said second mode.

41. A radiation image pick-up apparatus comprising:
   a plurality of photoelectric conversion elements for receiving X-ray wavelengths converted and emitted;
   a driving circuit for driving said photoelectric conversion elements, wherein said driving circuit has a function for setting said photoelectric conversion elements at a stand-by state or for performing reading drive;
   and a two-states switch for operating said driving circuit in the stand-by state and in a read driving state,
   wherein said two-states switch is at the stand-by state in a first state and is at the read driving state in a second state.

42. A radiation image pick-up apparatus comprising:
   a plurality of photoelectric conversion elements;
   a drive circuit for driving the photoelectric conversion elements; and
   a control circuit for controlling said driving,
   wherein said control circuit generates signals for starting a first mode for applying a voltage to said photoelectric conversion elements, and for starting, after stabilizing a dark current component of said photoelectric conversion elements after an elapse of a predetermined period in said first mode, a second mode for driving said photoelectric conversion elements and wherein said control circuit has a mechanism for effecting a restore state so as to apply no voltage to the photoelectric conversion elements in a non-operative period of the apparatus.

43. A radiation image pick-up apparatus comprising:
   a plurality of photoelectric conversion elements;
   a drive circuit for driving the photoelectric conversion elements; and
   a control circuit for controlling said driving,
   wherein said control circuit generates signals for starting a first mode for applying a voltage to said photoelectric conversion elements, and for starting, after stabilizing a dark current component of said photoelectric conversion elements after an elapse of a predetermined period in said first mode, a second mode for driving said photoelectric conversion elements and wherein said control circuit comprises a circuit for controlling the predetermined period of time from start of said first mode to start of the second mode.

44. A radiation image pick-up apparatus comprising:
plural photoelectric conversion elements for receiving X-ray wavelengths converted and emitted;
a driving circuit for driving said photoelectric conversion elements; and
a control circuit for controlling said driving circuit,
wherein said control circuit, responsive to a first input signal, drives said photoelectric conversion elements in a first mode, and, responsive to a second input signal, drives said photoelectric conversion elements in a second mode for reading an image.

45. A radiation image pick-up apparatus according to claim 44, further comprising mechanical switch means for producing the first and second input signals.

46. A radiation image pick-up apparatus according to claim 45, wherein said mechanical switch means has a first position for enabling a switch for producing the first input signal, and a second position for enabling a switch for generating the second input signal.

47. A radiation image pick-up apparatus according to claim 44, wherein the first signal for driving said photoelectric conversion elements in the second mode is produced upon an input of the second signal, after a predetermined period from the input of the first input signal.

48. A radiation image pick-up apparatus according to claim 44, wherein the first mode is a waiting mode, and the second mode is an exposure mode.

49. A radiation image pick-up apparatus according to claim 45, wherein said mechanical switch operates also as the switch means of exposure means.

50. A radiation image pick-up apparatus according to claim 49, wherein said control means outputs a signal for controlling said exposure means for image reading.

51. A radiation image pick-up apparatus according to claim 49, wherein said exposure means includes an X-ray source.

52. A radiation image pick-up apparatus according to claim 50, wherein said exposure means includes an X-ray source.

53. A method for driving a radiation image pick-up apparatus comprising plural photoelectric conversion elements for receiving X-ray wavelengths converted and emitted and a driving circuit for driving said photoelectric conversion elements, said method comprising:
in a first mode, responsive to a first input signal, setting the photoelectric conversion elements at a waiting state thereby stabilizing a dark current component of the photoelectric conversion elements; and
in a second mode, responsive to a second input signal, driving the photoelectric conversion elements for reading image.

54. A method for driving a radiation image pick-up apparatus according to claim 52, wherein in said waiting state, a driving unrelated to the reading image is performed.

55. A method for driving a radiation image pick-up apparatus according to claim 52, wherein in said waiting state, a refresh operation is performed.

56. A method for driving a radiation image pick-up apparatus according to claim 52, wherein said first and second input signals are produced by mechanical switch means.

57. A method for driving a radiation image pick-up apparatus according to claim 52, wherein said second input signal is used as a signal for producing X-rays for the reading image.

58. A method for driving a radiation image pick-up apparatus according to claim 52, wherein said second mode is performed when, after inputting the first input signal for the first mode, a predetermined time is elapsed, and the second input is inputted.

59. A radiation image pick-up apparatus comprising a photoelectric conversion section including photoelectric conversion elements arranged two dimensionally, and a control circuit for controlling said photoelectric conversion section,
wherein said radiation image pick-up apparatus has a first mode for initializing said photoelectric conversion elements at plural times before obtaining a signal output from said photoelectric conversion elements, and
a second mode, changed from the first mode in response to a switch, for exposing to light said photoelectric conversion elements and for obtaining a signal from said photoelectric conversion elements.

60. An apparatus according to claim 59, wherein
said second mode includes a photographing mode and a correcting mode.

61. An apparatus according to claim 60, wherein said photographing mode includes an exposing period, and
said correction mode includes a non-exposing period of substantially the same length as the exposing period.

62. An apparatus according to claim 61, wherein
before the exposing period in the photographing period, and before the non-photographing period in the correction mode, a dummy reading time is conducted at one or more times, and an operation timing of the photoelectric conversion section before and after the exposing period and an operation timing of the photoelectric conversion section before and after the non-exposing period are substantially the same.

63. An apparatus according to claim 61, wherein the exposing period is controlled by photographing condition control means during the exposing.

64. An apparatus according to claim 61, wherein
in the first mode, initializing the photoelectric conversion section is performed periodically, and the initializing period does not include the exposing period or the non-exposing period.

65. An apparatus according to claim 64, wherein
the operation timing of the photoelectric conversion section in the periodic initialization in the first mode and the operation timing of the photoelectric conversion section in other than the exposing period and the non-exposing period in the second mode are substantially the same.

66. An apparatus according to claim 65, wherein
the operation of the periodic initialization at producing the signal of the switch is used as the photographing mode, and performs the exposing continuously.

67. An apparatus according to claim 60, wherein
reading data for the correction includes reading data for correcting a fixed pattern noise.

68. An apparatus according to claim 60, wherein
reading data for correction include reading data for correcting gain variation.

69. An apparatus according to claim 60, wherein
data at reading carriers containing the optical information and data at reading data for correction are subjected to an arithmetic operation to produce image information data.

70. An apparatus according to claim 59, wherein
initialization of the photoelectric conversion elements in the first mode is performed periodically, and, upon termination of the periodic initialization at the producing of the signal by the switch, the mode is changed into the second mode.

71. An apparatus according to claim 59, wherein
the initialization of the photoelectric conversion elements is performed periodically in the first mode, and the periodic initialization is interrupted at the producing the signal by the switch, and then the mode is changed into the second mode.

72. An apparatus according to claim 59, wherein
the exposing includes an emission of the radiation.

73. An apparatus according to claim 59, wherein
immediately after the second mode, an electric field of the photoelectric conversion elements is set at a stop mode.

74. An apparatus according to claim 59, wherein
immediately after the second mode, the mode is changed into the first mode.

75. An apparatus according to claim 74, wherein
after the mode change into the first mode, when no switch operation has been performed for a predetermined period, an electric field of the photoelectric conversion elements is set at a stop mode.

* * * * *

UNITED STATES PATENT AND TRADEMARK OFFICE
CERTIFICATE OF CORRECTION

PATENT NO. : 6,127,684
DATED : October 3, 2000
INVENTOR(S) : Noriyuki Kaifu

It is certified that error appears in the above-identified patent and that said Letters Patent is hereby corrected as shown below:

Column 7,
Line 33, "two" should read -- two items of --.

Column 9,
Line 54, "part" should read -- parts --.

Column 10,
Line 2, "there from." should read -- therefrom. --;
Line 3, "is" should read -- are --.

Column 14,
Line 53, "the both" should read -- both --.

Column 15,
Line 67, "the all" should read -- all the --.

Column 16,
Lines 44 and 57, "the" should read -- all the --;
Lines 45 and 58, "all" should be deleted;
Lines 46, 50 and 51, "the all" should read -- all the --;

Column 21,
Line 48, "than" should read -- as compared with --.

Column 24,
Line 27, "ready of" should read -- readiness to --.

Column 25,
Lines 59, 62 and 65, "claim 52," should read -- claim 53, --;

UNITED STATES PATENT AND TRADEMARK OFFICE
CERTIFICATE OF CORRECTION

PATENT NO. : 6,127,684
DATED : October 3, 2000
INVENTOR(S) : Noriyuki Kaifu

It is certified that error appears in the above-identified patent and that said Letters Patent is hereby corrected as shown below:

Column 26,
Line 2 and 5, "claim 52," should read -- claim 53, --;
Line 11, "two dimensionally" should read -- two-dimensionally --;
Line 30, "photographing period," should read -- photographing mode, --.

Signed and Sealed this

Eleventh Day of December, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.    : 6,127,684
DATED         : February 25, 1997
INVENTOR(S)   : Noriyuki Kaifu It is certified that error appears in the above-identified patent and that said Letters Patent is hereby corrected as shown below:

<u>Title page,</u>
Item [30], Foreign Application Priority Data,
"Feb. 26, 1996  [JP]  Japan ……………….. 8-038185" should read
-- Feb. 26, 1996  [JP]  Japan ……………… 8-038135 --.

Signed and Sealed this

Seventeenth Day of December, 2002

JAMES E. ROGAN
*Director of the United States Patent and Trademark Office*